United States Patent
Hunt et al.

(10) Patent No.: US 10,445,708 B2
(45) Date of Patent: Oct. 15, 2019

(54) SYSTEM FOR ELECTRICALLY TESTING MOBILE DEVICES AT A CONSUMER-OPERATED KIOSK, AND ASSOCIATED DEVICES AND METHODS

(71) Applicant: ecoATM. LLC, San Diego, CA (US)

(72) Inventors: Loren Hunt, San Diego, CA (US); James Andrew Snook, San Diego, CA (US); Rick Segil, San Diego, CA (US); Prabhakar Doppalapudi, San Diego, CA (US); Henry Flournoy, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 1318 days.

(21) Appl. No.: 14/506,449

(22) Filed: Oct. 3, 2014

(65) Prior Publication Data
US 2016/0098688 A1 Apr. 7, 2016

(51) Int. Cl.
*G06Q 10/00* (2012.01)
*G07F 7/06* (2006.01)
(Continued)

(52) U.S. Cl.
CPC ............ *G06Q 10/30* (2013.01); *G06Q 20/18* (2013.01); *G06Q 30/02* (2013.01); *G07F 7/06* (2013.01);
(Continued)

(58) Field of Classification Search
None
See application file for complete search history.

(56) References Cited

U.S. PATENT DOCUMENTS

| 3,808,439 A | 4/1974 | Renius |
| 4,248,334 A | 2/1981 | Hanley et al. |

(Continued)

FOREIGN PATENT DOCUMENTS

| CN | 1365479 A1 | 8/2002 |
| CN | 2708415 A1 | 7/2005 |

(Continued)

OTHER PUBLICATIONS

Dennis Bournique: "Mobile Karma Shuts Down As iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.

(Continued)

*Primary Examiner* — David M. Gray
*Assistant Examiner* — Geoffrey T Evans
(74) *Attorney, Agent, or Firm* — Perkins Coie, LLP

(57) ABSTRACT

A system for recycling a mobile device. A system configured in accordance with one embodiment of the present technology includes an electrical connector and testing electronics. The electrical connector is configured to be electrically connected to a mobile device, and the testing electronics are configured to produce an electrical measurement by measuring an electrical attribute associated with a hardware component of the mobile device over the electrical connector. The system is further configured to valuate, identify, and/or authenticate the mobile device based at least in part on the electrical measurement.

13 Claims, 10 Drawing Sheets

(51) Int. Cl.
    *H04M 1/02*        (2006.01)
    *H04M 1/24*        (2006.01)
    *G06Q 20/18*       (2012.01)
    *G06Q 30/02*       (2012.01)

(52) U.S. Cl.
    CPC ........... *H04M 1/0287* (2013.01); *H04M 1/24*
                 (2013.01); *Y02W 30/82* (2015.05); *Y02W
                                          90/20* (2015.05)

(56) References Cited

U.S. PATENT DOCUMENTS

| | | |
|---|---|---|
| 4,519,522 A | 5/1985 | McElwee |
| 4,715,709 A | 12/1987 | Sekine et al. |
| 4,821,118 A | 4/1989 | Lafreniere |
| 4,870,357 A | 9/1989 | Young et al. |
| 4,878,736 A | 11/1989 | Hekker et al. |
| 4,927,051 A | 5/1990 | Falk et al. |
| 4,951,308 A | 8/1990 | Bishop et al. |
| 5,027,074 A | 6/1991 | Haferstat |
| 5,077,462 A | 12/1991 | Newell et al. |
| 5,091,773 A | 2/1992 | Fouche et al. |
| 5,105,149 A | 4/1992 | Tokura |
| 5,216,502 A | 6/1993 | Katz |
| 5,280,170 A | 1/1994 | Baldwin |
| 5,319,459 A | 6/1994 | Mochizuki et al. |
| 5,339,096 A | 8/1994 | Beaufort et al. |
| 5,419,438 A | 5/1995 | Squyres et al. |
| 5,436,554 A | 7/1995 | Decker |
| 5,570,920 A | 11/1996 | Crisman et al. |
| 5,572,444 A | 11/1996 | Lentz et al. |
| 5,610,710 A | 3/1997 | Canfield et al. |
| 5,717,780 A | 2/1998 | Mitsumune et al. |
| 5,747,784 A | 5/1998 | Walter et al. |
| 5,775,806 A | 7/1998 | Allred |
| 5,839,058 A | 11/1998 | Phillips et al. |
| 5,920,338 A | 7/1999 | Katz |
| 5,949,901 A | 9/1999 | Nichani et al. |
| 5,965,858 A | 10/1999 | Suzuki et al. |
| 5,966,654 A | 10/1999 | Croughwell et al. |
| 5,987,159 A | 11/1999 | Nichani |
| 5,988,431 A | 11/1999 | Roe |
| 6,029,851 A | 2/2000 | Jenkins et al. |
| 6,041,229 A | 3/2000 | Turner |
| 6,181,805 B1 | 1/2001 | Koike et al. |
| 6,228,008 B1 | 5/2001 | Pollington et al. |
| 6,259,827 B1 | 7/2001 | Nichani |
| 6,264,104 B1 | 7/2001 | Jenkins et al. |
| 6,330,354 B1 | 12/2001 | Companion et al. |
| 6,330,958 B1 | 12/2001 | Ruskin et al. |
| 6,393,095 B1 | 5/2002 | Robinson |
| 6,462,644 B1 | 10/2002 | Howell et al. |
| 6,529,837 B1 | 3/2003 | Kang |
| 6,535,637 B1 | 3/2003 | Wootton et al. |
| 6,573,886 B1 | 6/2003 | Lehtinen et al. |
| 6,587,581 B1 | 7/2003 | Matsuyama et al. |
| 6,595,684 B1 | 7/2003 | Casagrande et al. |
| 6,633,377 B1 | 10/2003 | Weiss et al. |
| 6,667,800 B1 | 12/2003 | Larsson et al. |
| 6,754,637 B1 | 6/2004 | Stenz |
| 6,758,370 B2 | 7/2004 | Cooke et al. |
| 6,798,528 B1 | 9/2004 | Hartman |
| 6,822,422 B2 | 11/2004 | Sagawa |
| 6,842,596 B2 | 1/2005 | Morii et al. |
| 6,854,656 B2 | 2/2005 | Matsumori |
| 7,069,236 B1 | 6/2006 | Tsunenari |
| 7,076,449 B2 | 7/2006 | Tsunenari et al. |
| 7,178,720 B1 | 2/2007 | Strubbe et al. |
| 7,234,609 B2 | 6/2007 | DeLazzer et al. |
| 7,251,458 B2 | 7/2007 | O'Connell |
| 7,268,345 B2 | 9/2007 | Schultz |
| 7,334,729 B2 | 2/2008 | Brewington |
| 7,520,666 B2 | 4/2009 | Pevzner et al. |
| 7,567,344 B2 | 7/2009 | LeBlanc et al. |
| 7,646,193 B2 | 1/2010 | Suzuki et al. |
| 7,649,450 B2 | 1/2010 | Campion, Jr. et al. |
| 7,702,108 B2 | 4/2010 | Amon et al. |
| 7,735,125 B1 | 6/2010 | Alvarez et al. |
| 7,761,331 B2 | 7/2010 | Low et al. |
| 7,783,379 B2 | 8/2010 | Beane et al. |
| 7,881,965 B2 | 2/2011 | Bowles et al. |
| 8,010,402 B1 | 8/2011 | Sharma et al. |
| 8,019,588 B1 | 9/2011 | Wohlberg et al. |
| 8,025,229 B2 | 9/2011 | Hammond et al. |
| 8,031,930 B2 | 10/2011 | Wang et al. |
| 8,107,243 B2 | 1/2012 | Guccione et al. |
| 8,112,325 B2 | 2/2012 | Foy et al. |
| 8,195,511 B2 | 6/2012 | Bowles et al. |
| 8,200,533 B2 | 6/2012 | Librizzi et al. |
| 8,254,883 B2 | 8/2012 | Uchida |
| 8,266,008 B1 | 9/2012 | Siegel et al. |
| 8,423,404 B2 | 4/2013 | Bowles et al. |
| 8,429,021 B2 | 4/2013 | Kraft et al. |
| 8,463,646 B2 | 6/2013 | Bowles et al. |
| 8,543,358 B2 | 9/2013 | Trabona |
| 8,566,183 B1 | 10/2013 | Bonar et al. |
| 8,606,633 B2 | 12/2013 | Tarbert et al. |
| 8,718,717 B2 | 5/2014 | Vaknin et al. |
| 8,743,215 B1 | 6/2014 | Lee |
| 8,824,136 B1 | 9/2014 | Interian, III et al. |
| 9,010,627 B1 | 4/2015 | Prasad et al. |
| 9,043,026 B2 | 5/2015 | Lien et al. |
| 9,195,979 B2 | 11/2015 | Geller |
| 9,317,989 B2 | 4/2016 | Grow et al. |
| 9,582,101 B2 | 2/2017 | Chang et al. |
| 9,595,238 B2 | 3/2017 | Won |
| 9,818,160 B2 | 11/2017 | Bowles et al. |
| 9,881,284 B2 | 1/2018 | Bowles et al. |
| 9,911,102 B2 | 3/2018 | Bowles |
| 10,032,140 B2 | 7/2018 | Bowles et al. |
| 10,055,798 B2 | 8/2018 | Bowles et al. |
| 10,127,647 B2 | 11/2018 | Forutanpour et al. |
| 2001/0039531 A1 | 11/2001 | Aoki |
| 2002/0014577 A1 | 2/2002 | Ulrich et al. |
| 2002/0035515 A1 | 3/2002 | Moreno |
| 2002/0067184 A1 | 6/2002 | Smith et al. |
| 2002/0087413 A1 | 7/2002 | Mahaffy et al. |
| 2002/0129170 A1 | 9/2002 | Moore et al. |
| 2002/0157033 A1 | 10/2002 | Cox |
| 2002/0162966 A1 | 11/2002 | Yoder |
| 2002/0186878 A1 | 12/2002 | Hoon et al. |
| 2003/0006277 A1 | 1/2003 | Maskatiya et al. |
| 2003/0036866 A1 | 2/2003 | Nair et al. |
| 2003/0061150 A1 | 3/2003 | Kocher |
| 2003/0146898 A1 | 8/2003 | Kawasaki et al. |
| 2003/0170529 A1 | 9/2003 | Sagawa |
| 2003/0197782 A1 | 10/2003 | Ashe et al. |
| 2003/0204289 A1 | 10/2003 | Banerjee et al. |
| 2004/0012825 A1 | 1/2004 | Tesavis |
| 2004/0114153 A1 | 6/2004 | Andersen et al. |
| 2004/0141320 A1 | 7/2004 | Bock et al. |
| 2004/0150815 A1 | 8/2004 | Sones et al. |
| 2004/0156557 A1 | 8/2004 | Van Der Weij |
| 2004/0156667 A1 | 8/2004 | Berger et al. |
| 2004/0186744 A1 | 9/2004 | Lux |
| 2004/0205015 A1 | 10/2004 | DeLaCruz |
| 2004/0235513 A1 | 11/2004 | O'Connell |
| 2004/0242216 A1 | 12/2004 | Boutsikakis |
| 2004/0262521 A1 | 12/2004 | Devitt et al. |
| 2005/0027622 A1 | 2/2005 | Walker et al. |
| 2005/0128551 A1 | 6/2005 | Yang |
| 2005/0139661 A1 | 6/2005 | Eglen et al. |
| 2005/0143149 A1 | 6/2005 | Becker et al. |
| 2005/0167620 A1 | 8/2005 | Cho et al. |
| 2005/0187657 A1 | 8/2005 | Hashimoto et al. |
| 2005/0216120 A1 | 9/2005 | Rosenberg et al. |
| 2005/0222690 A1 | 10/2005 | Wang et al. |
| 2005/0231595 A1 | 10/2005 | Wang et al. |
| 2005/0240958 A1 | 10/2005 | Nguyen et al. |
| 2006/0038114 A9 | 2/2006 | Cofer et al. |
| 2006/0047573 A1 | 3/2006 | Mitchell et al. |
| 2006/0074756 A1 | 4/2006 | Boykin |
| 2006/0167580 A1 | 7/2006 | Whittier |
| 2006/0184379 A1 | 8/2006 | Tan et al. |

(56) References Cited

U.S. PATENT DOCUMENTS

| | | |
|---|---|---|
| 2006/0195384 A1 | 8/2006 | Bauer et al. |
| 2006/0217152 A1 | 9/2006 | Fok et al. |
| 2006/0229108 A1 | 10/2006 | Cehelnik |
| 2006/0235747 A1 | 10/2006 | Hammond et al. |
| 2006/0261931 A1 | 11/2006 | Cheng |
| 2006/0271431 A1 | 11/2006 | Wehr et al. |
| 2006/0279307 A1 | 12/2006 | Wang et al. |
| 2006/0280356 A1 | 12/2006 | Yamagishi |
| 2007/0013124 A1 | 1/2007 | Graef et al. |
| 2007/0057815 A1 | 3/2007 | Foy et al. |
| 2007/0129906 A1 | 6/2007 | Stoecker et al. |
| 2007/0133844 A1 | 6/2007 | Waehner et al. |
| 2007/0140310 A1 | 6/2007 | Rolton et al. |
| 2007/0150403 A1 | 6/2007 | Mock et al. |
| 2007/0205751 A1 | 9/2007 | Suzuki et al. |
| 2007/0263099 A1 | 11/2007 | Motta et al. |
| 2007/0269099 A1 | 11/2007 | Nishino et al. |
| 2007/0281734 A1 | 12/2007 | Mizrachi |
| 2008/0004828 A1 | 1/2008 | Mizrachi |
| 2008/0027581 A1 | 1/2008 | Saether et al. |
| 2008/0033596 A1 | 2/2008 | Fausak et al. |
| 2008/0097770 A1 | 4/2008 | Low et al. |
| 2008/0109746 A1 | 5/2008 | Mayer |
| 2008/0111989 A1 | 5/2008 | Dufour et al. |
| 2008/0149720 A1 | 6/2008 | Colville |
| 2008/0177598 A1 | 7/2008 | Davie |
| 2008/0207198 A1 | 8/2008 | Juric |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0281691 A1 | 11/2008 | Pearson et al. |
| 2008/0296374 A1 | 12/2008 | Gonen et al. |
| 2008/0303915 A1 | 12/2008 | Omi |
| 2008/0306701 A1 | 12/2008 | Zhong et al. |
| 2009/0051907 A1 | 2/2009 | Li et al. |
| 2009/0078775 A1 | 3/2009 | Giebel et al. |
| 2009/0079388 A1 | 3/2009 | Reddy |
| 2009/0095047 A1 | 4/2009 | Patel et al. |
| 2009/0160668 A1 | 6/2009 | Crowley et al. |
| 2009/0184865 A1 | 7/2009 | Valo et al. |
| 2009/0190142 A1 | 7/2009 | Taylor et al. |
| 2009/0207743 A1 | 8/2009 | Huq et al. |
| 2009/0244285 A1 | 10/2009 | Chathukutty Silky |
| 2009/0247133 A1 | 10/2009 | Holmen et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2010/0005004 A1 | 1/2010 | Hudak et al. |
| 2010/0063894 A1 | 3/2010 | Lundy |
| 2010/0088192 A1 | 4/2010 | Bowles et al. |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0169231 A1 | 7/2010 | Bowles et al. |
| 2010/0188506 A1 | 7/2010 | Wolff et al. |
| 2010/0219234 A1 | 9/2010 | Forbes |
| 2010/0228676 A1 | 9/2010 | Librizzi et al. |
| 2010/0235198 A1 | 9/2010 | Fini et al. |
| 2010/0237854 A1 | 9/2010 | Kumhyr et al. |
| 2010/0262481 A1 | 10/2010 | Baker et al. |
| 2011/0035322 A1 | 2/2011 | Lively |
| 2011/0043628 A1 | 2/2011 | Yun |
| 2011/0060641 A1 | 3/2011 | Grossman et al. |
| 2011/0067520 A1 | 3/2011 | Ihrke et al. |
| 2011/0235853 A1 | 9/2011 | Bowles et al. |
| 2011/0313840 A1 | 12/2011 | Mason et al. |
| 2012/0016518 A1 | 1/2012 | Saario et al. |
| 2012/0029985 A1 | 2/2012 | Wilson et al. |
| 2012/0030097 A1 | 2/2012 | Hagan et al. |
| 2012/0054113 A1 | 3/2012 | Jayaraman et al. |
| 2012/0063501 A1 | 3/2012 | Aguren |
| 2012/0078413 A1 | 3/2012 | Baker, Jr. |
| 2012/0116928 A1 | 5/2012 | Gventer et al. |
| 2012/0116929 A1 | 5/2012 | Gventer et al. |
| 2012/0117001 A1 | 5/2012 | Gventer et al. |
| 2012/0127307 A1 | 5/2012 | Hassenzahl |
| 2012/0146956 A1 | 6/2012 | Jenkinson |
| 2012/0191562 A1 | 7/2012 | Bowles et al. |
| 2012/0235812 A1 | 9/2012 | De Mello et al. |
| 2012/0254046 A1 | 10/2012 | Librizzi et al. |
| 2012/0303431 A1 | 11/2012 | Phillips et al. |
| 2013/0006713 A1 | 1/2013 | Haake |
| 2013/0034305 A1 | 2/2013 | Jahanshahi et al. |
| 2013/0046611 A1 | 2/2013 | Bowles et al. |
| 2013/0046699 A1 | 2/2013 | Bowles et al. |
| 2013/0124426 A1 | 5/2013 | Bowles et al. |
| 2013/0126741 A1 | 5/2013 | Srivastava et al. |
| 2013/0144797 A1 | 6/2013 | Bowles et al. |
| 2013/0155061 A1 | 6/2013 | Jahanshahi et al. |
| 2013/0173434 A1 | 7/2013 | Hartman |
| 2013/0181935 A1 | 7/2013 | Mckenzie et al. |
| 2013/0191236 A1 | 7/2013 | Bowles |
| 2013/0198089 A1 | 8/2013 | Bowles |
| 2013/0198144 A1 | 8/2013 | Bowles |
| 2013/0226679 A1 | 8/2013 | Bowles |
| 2013/0246211 A1 | 9/2013 | Sullivan |
| 2013/0246212 A1 | 9/2013 | Sullivan |
| 2013/0253700 A1 | 9/2013 | Carson et al. |
| 2013/0275314 A1 | 10/2013 | Bowles |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0012643 A1 | 1/2014 | Behrisch |
| 2014/0038556 A1 | 2/2014 | De Sousa |
| 2014/0052329 A1 | 2/2014 | Amirpour |
| 2014/0067710 A1 | 3/2014 | Gventer et al. |
| 2014/0143161 A1 | 5/2014 | Ahn |
| 2014/0150100 A1 | 5/2014 | Gupta et al. |
| 2014/0156883 A1 | 6/2014 | Bowles |
| 2014/0214505 A1 | 7/2014 | Shuster-Arechiga et al. |
| 2014/0235258 A1 | 8/2014 | Chen et al. |
| 2014/0244315 A1 | 8/2014 | Cahill et al. |
| 2014/0347473 A1 | 11/2014 | Wolff et al. |
| 2015/0006281 A1 | 1/2015 | Takahashi |
| 2015/0066677 A1 | 3/2015 | Bowles et al. |
| 2015/0088731 A1 | 3/2015 | Ackerman |
| 2015/0120485 A1 | 4/2015 | Nash |
| 2015/0193797 A1 | 7/2015 | Gerrity |
| 2015/0206200 A1 | 7/2015 | Edmondson et al. |
| 2015/0278529 A1 | 10/2015 | Cho |
| 2015/0332206 A1 | 11/2015 | Trew et al. |
| 2015/0356637 A1 | 12/2015 | Graffia et al. |
| 2016/0019685 A1 | 1/2016 | Nguyen |
| 2016/0055392 A1 | 2/2016 | Nakano |
| 2016/0091549 A1* | 3/2016 | Snook .................. G01R 31/021 324/543 |
| 2016/0092849 A1 | 3/2016 | Cirannek et al. |
| 2016/0098688 A1 | 4/2016 | Hunt et al. |
| 2016/0098689 A1* | 4/2016 | Bowles .................. G06Q 20/18 705/23 |
| 2016/0098690 A1 | 4/2016 | Silva et al. |
| 2016/0125367 A1 | 5/2016 | Bowles et al. |
| 2016/0125548 A1 | 5/2016 | Bowles et al. |
| 2016/0125612 A1 | 5/2016 | Seki et al. |
| 2016/0132840 A1 | 5/2016 | Bowles et al. |
| 2016/0171456 A1 | 6/2016 | Bowles |
| 2016/0171544 A1 | 6/2016 | Heminger et al. |
| 2016/0171575 A1 | 6/2016 | Bowles et al. |
| 2016/0210648 A1 | 7/2016 | Cirannek |
| 2016/0269401 A1 | 9/2016 | Saito et al. |
| 2016/0275460 A1 | 9/2016 | Ploetner et al. |
| 2016/0275518 A1 | 9/2016 | Bowles et al. |
| 2016/0379287 A1 | 12/2016 | Dabiri et al. |
| 2017/0083886 A1 | 3/2017 | Silva et al. |
| 2017/0091823 A1 | 3/2017 | Adinarayan et al. |

(56) References Cited

U.S. PATENT DOCUMENTS

| | | | |
|---|---|---|---|
| 2017/0169401 | A1 | 6/2017 | Beane et al. |
| 2017/0278191 | A1 | 9/2017 | Tassone et al. |

FOREIGN PATENT DOCUMENTS

| | | | |
|---|---|---|---|
| CN | 1957320 | A1 | 5/2007 |
| CN | 200965706 | Y | 10/2007 |
| CN | 102246384 | | 11/2011 |
| CN | 202351953 | U | 7/2012 |
| CN | 202394296 | U | 8/2012 |
| CN | 102654927 | A | 9/2012 |
| CN | 102812500 | A1 | 12/2012 |
| CN | 102930642 | A | 2/2013 |
| CN | 102976004 | A | 3/2013 |
| CN | 103198562 | A | 7/2013 |
| CN | 103226870 | A | 7/2013 |
| CN | 203242065 | U | 10/2013 |
| CN | 103440607 | A | 12/2013 |
| CN | 103544772 | A | 1/2014 |
| CN | 203408902 | U | 1/2014 |
| CN | 103662541 | A | 3/2014 |
| CN | 103679147 | A | 3/2014 |
| CN | 203520502 | U | 4/2014 |
| CN | 203588366 | U | 5/2014 |
| CN | 103954626 | | 7/2014 |
| CN | 105513201 | A1 | 4/2016 |
| EP | 1168253 | A1 | 1/2002 |
| GB | 2167553 | | 5/1986 |
| JP | 2007112801 | A | 5/1995 |
| JP | H07334589 | A | 12/1995 |
| JP | 2000-121564 | A | 4/2000 |
| JP | 3123095 | | 1/2001 |
| JP | 2002-019147 | A | 1/2002 |
| JP | 2002183286 | A | 6/2002 |
| JP | 2002-259528 | A | 9/2002 |
| JP | 2002302252 | A | 10/2002 |
| JP | 2002324264 | A | 11/2002 |
| JP | 2002358354 | A | 12/2002 |
| JP | 2003139516 | A1 | 5/2003 |
| JP | 2003242243 | A | 8/2003 |
| JP | 2003-267509 | A | 9/2003 |
| JP | 2003264007 | A | 9/2003 |
| JP | 2004021569 | A | 1/2004 |
| JP | 2004-303102 | A | 10/2004 |
| JP | 2004288143 | A | 10/2004 |
| JP | 2004341681 | A | 12/2004 |
| JP | 2006127308 | A | 5/2006 |
| JP | 2006195814 | A | 7/2006 |
| JP | 2006227764 | A | 8/2006 |
| JP | 2006260246 | A | 9/2006 |
| JP | 2007141266 | A | 6/2007 |
| JP | 2007179516 | A | 7/2007 |
| JP | 2007-265340 | A | 10/2007 |
| JP | 2008522299 | A | 6/2008 |
| JP | 2008293391 | A | 12/2008 |
| JP | 2009086725 | A | 4/2009 |
| JP | 2009245058 | A | 10/2009 |
| JP | 2009250971 | A1 | 10/2009 |
| JP | 2010177720 | A | 8/2010 |
| JP | 2012058932 | A | 3/2012 |
| JP | 2013033361 | A | 2/2013 |
| JP | 2013037441 | A | 2/2013 |
| JP | 2013551823 | A1 | 8/2013 |
| KR | 20000064168 | | 11/2000 |
| KR | 20130085255 | A | 7/2013 |
| KR | 20140037543 | A | 3/2014 |
| WO | WO-01/15096 | A1 | 3/2001 |
| WO | 205176 | A1 | 1/2002 |
| WO | WO-225613 | | 3/2002 |
| WO | WO-2002039357 | A1 | 5/2002 |
| WO | WO-2003012717 | A1 | 2/2003 |
| WO | WO-2003014994 | A1 | 2/2003 |
| WO | WO-2004021114 | A2 | 3/2004 |
| WO | 2004114490 | A1 | 12/2004 |
| WO | 2005008566 | A1 | 1/2005 |
| WO | WO-2005101346 | A1 | 10/2005 |
| WO | 2006058601 | A1 | 6/2006 |
| WO | WO-2006080851 | A2 | 8/2006 |
| WO | WO-2007066166 | | 6/2007 |
| WO | 2009128173 | A1 | 10/2009 |
| WO | 2009129526 | A1 | 10/2009 |
| WO | WO-2010/040116 | A1 | 4/2010 |
| WO | WO-2010128267 | A1 | 11/2010 |
| WO | WO-2010128315 | A1 | 11/2010 |
| WO | WO-2011131016 | A1 | 10/2011 |
| WO | 2012138679 | A1 | 10/2012 |
| WO | WO-2013/063042 | A1 | 5/2013 |
| WO | WO-2013074819 | A1 | 5/2013 |
| WO | WO-2014075055 | | 5/2014 |
| WO | 2015022409 | A1 | 2/2015 |

OTHER PUBLICATIONS

Tecace Software: "Your phone appraisal—Movaluate—Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.
Co-Pending U.S. Appl. No. 15/855,320 of Forutanpour et al., filed Dec. 27, 2017.
Co-Pending U.S. Appl. No. 15/130,851 of Forutanpour, B. et al., filed Apr. 15, 2016.
Co-Pending U.S. Appl. No. 15/195,828 of Forutanpour, B. et al., filed Jun. 28, 2016.
Co-Pending U.S. Appl. No. 15/630,508 of Silva, J. et al., filed Jun. 22, 2017.
Co-Pending U.S. Appl. No. 15/630,539 of Bowles, M. et al., filed Jun. 22, 2017.
Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].
Kanter, James Max, "Color Crack:Identifying Cracks in Glass," dated Dec. 9, 2014; retrieved from the internet http://www.jmaxkanter.com/static/papers/color_crack.pdf on Sep. 22, 2017.
Oliveira, et al., "Automatic crack detection on road imagery using anisotropic diffusion and region linkage," 18th European Signal Processing Conference (EUSIPCO-2010), Aug. 23, 2010, pp. 274-278.
Zhang, Yiyang, "The design of glass crack detection system based on image preprocessing technology," 2014 IEEE 7th Joint International Information Technology and Artificial Intelligence Conference, IEEE, 20 Dec. 20, 2014; pp. 39-42.
Graffia et al., "Retail Station for E-Device Identification, Assessment, and Trade-In", Jun. 6, 2014 (Drawings and Specification) (Year: 2014).
Trading devices for dollars, The Economist (US) 405.8813:8 (US), Economist Intelligence Unit N.A. Incorporated, Dec. 1, 2012.
Turner, "5 MP3 Players for Pumping Up Your Workouts," Mashable.com, Nov. 4, 2010, available online at https://mashable.com/2010/11/04/mp3-players-for-sports/ (Year: 2010).
Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, pp. 3.
Altec Lansing User's Guide 2007, 8 pages.
Business Wire, "The World's First Office Photography Machine" at CES 2008 Launched by Ortery technologies, Jan. 7, 2008, 3 pages.
Examination Report for Canadian Application No. 2,739,633, dated Dec. 6, 2013, 3 pages.
Evgenii Masunov, Mar. 25, 2010, http://www.appleinsider.ru/news/ipone-obladaet-luchshim-tachskrinom-provereno_robotom.html, 4 pages.
International Numbering Plan, www.numberingplans.com, 2 pages.
Office Action dated Apr. 8, 2013 for Chinese Application No. 200980148240.3, 12 pages.

(56) References Cited

OTHER PUBLICATIONS

Office Action dated Jan. 13, 2014 for Chinese Application No. 200980148240.3, 13 pages.
Office Action dated Aug. 6, 2013 in Japanese Patent Application No. 2011530284, 7 pages.
Office Action dated Jul. 1, 2014 in Japanese Patent Application No. 2011530284, 4 pages.
Office Action dated Sep. 3, 2012 in European Patent Application No. 09818605.9, 7 pages.
PCT International Search Report and Written Opinion dated Feb. 3, 2010 for PCT Application No. PCT/US09/59461, filed Oct. 2, 2008, 7 pages.
PCT International Search Report and Written Opinion dated Nov. 30, 2011 for PCT Application No. PCT/US2011/028251, filed Mar. 13, 2011, 8 pages.
PCT International Search Report and Written Opinion dated Jul. 5, 2012 for PCT Application PCT/US2012/032042, filed Apr. 4, 2012, 5 pages.
PCT International Search Report and Written Opinion dated Aug. 1, 2014 for PCT/US2013/023717 filed Jan. 30, 2013, 4 pages.
PCT International Search Report and Written Opinion dated Jan. 31, 2013 for PCT Application PCT/US2012/061587, filed Oct. 24, 2012, 11 pages.
PCT International Search Report and Written Opinion dated Apr. 3, 2014 for PCT/US2013/072697 filed Dec. 2, 2013, 7 pages.
PCT International Search Report and Written Opinion dated Jul. 18, 2014 for PCT Application No. PCT/US2014/024551, filed Mar. 12, 2014, 11 pages.
Rawson, Chris, "TUAW: 25 Ways to Check the Hardware on Your iPhone 4", published Aug. 13, 2010, retrieved at http://www.tuaw.com/2010/08/13/hardware-test-your-iphone-4/ on Feb. 28, 2014.
Rehg et al., Vision for a Smart Kiosk, 1997 IEEE Computer Society Conference on Computer Vision and Pattern Recognition. 7 pages.
Rolf Steinhilper, "Remanufacturing: The Ultimate Form of Recycling", Fraunhofer IRB Verlag, 1998, parts 1-3, ; http:// www.reman.org/Publications_main.htm., 88 pages.
Yahoo! Answers, "What is a clean ESN?" published Jun. 23, 2009, retrieved from http://web.archive.org/web/20090623215042/http://answers.yahoo.com/question/inde, 8020US?qid=20080318061012AANFRco on Apr. 3, 2014.
Co-pending U.S. Appl. No. 14/500,739, filed Sep. 29, 2014.
Co-pending U.S. Appl. No. 14/498,763, filed Sep. 26, 2014.
Co-pending U.S. Appl. No. 14/568,051, filed Dec. 11, 2014.
2006 Florida Statutes Title XXXIII, Chapter 538, Sections 538.03 and 538.04, 7 pages.
CNET, "Tackling LCD "burn ins", and dead/stick Pixels", published Sep. 2, 2009, retrieved from http://www.cnet.com/news/tackling-lcd-burn-ins-and-deadstuck-pixels/.
Geekanoids, You Tube Video, "Apple iPhone 3GS Unboxing and Review", uploaded on Jun. 19, 2009, retrieved from http://www.youtube.com/watch?v=GCEi9QAeDqk on Sep. 2, 2009.
GSM Arena Glossary, "LCD (Liquid Crystal Display)", retrieved from http://www.gsmarena.com/glossary.php3?term=lcd on Apr. 28, 2016, 1 page.
International Search Report and Written Opinion dated Apr. 26, 2016 in International Application No. PCT/US2015/053457, 17 pages.
Lambert, Emily, "Use It Up, Wear It Out", Forbes 175.5 (2005): 77-78. Business Source Complete. Web. Jan. 6, 2015, 3 pages.
Littleton Partners with Donations Ink (Jan. 19, 2006) US Fed News Service, Including US State News. Web. Jan. 6, 2015, 1 page.
MobileGazette.com, "2006 in Review: The Good, The Bad and The Ugly", published Dec. 2006, retrieved from http://www.mobilegazette.com/2006-review-06x12x22.htm on Nov. 11, 2015.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
Perng et al., "A Novel Vision System for CRT Panel Auto-Inspection", Proceedings of the 2005 IEEE International Conference on Mechatronics, Jul. 10-12, 2005, pp. 4.
Perng et al., "A Novel Vision System for CRT PaNnel Auto-Inspection", Journal of the Chinese Institute of Industrial Engineers, vol. 24, No. 5, pp. 341-350 (2007).

\* cited by examiner

SYSTEM FOR ELECTRICALLY TESTING MOBILE DEVICES AT A CONSUMER-OPERATED KIOSK, AND ASSOCIATED DEVICES AND METHODS

TECHNICAL FIELD

The present disclosure is directed generally to methods and systems for electrically testing mobile devices and other consumer electronic devices at a consumer-operated kiosk.

BACKGROUND

Consumer electronic devices, such as mobile phones, laptop computers, notebooks, tablets, MP3 players, etc., are ubiquitous. Currently there are over 6 billion mobile devices in use in the world; and the number of these devices is growing rapidly with more than 1.8 billion mobile phones being sold in 2013 alone. By 2017 it is expected that there will be more mobile devices in use than there are people on the planet. In addition to mobile phones, over 300 million desk-based and notebook computers shipped in 2013, and for the first time the number of tablet computers shipped exceeded laptops. Part of the reason for the rapid growth in the number of mobile phones and other electronic devices is the rapid pace at which these devices evolve, and the increased usage of such devices in third world countries.

As a result of the rapid pace of development, a relatively high percentage of electronic devices are replaced every year as consumers continually upgrade their mobile phones and other electronic devices to obtain the latest features or a better operating plan. According to the U.S. Environmental Protection Agency, the U.S. alone disposes of over 370 million mobile phones, PDAs, tablets, and other electronic devices every year. Millions of other outdated or broken mobile phones and other electronic devices are simply tossed into junk drawers or otherwise kept until a suitable disposal solution arises.

Although many electronic device retailers and cell carrier stores now offer mobile phone trade-in or buyback programs, many old mobile phones still end up in landfills or are improperly disassembled and disposed of in developing countries. Unfortunately, however, mobile phones and similar devices typically contain substances that can be harmful to the environment, such as arsenic, lithium, cadmium, copper, lead, mercury and zinc. If not properly disposed of, these toxic substances can seep into groundwater from decomposing landfills and contaminate the soil with potentiality harmful consequences for humans and the environment. As an alternative to retailer trade-in or buyback programs, consumers can now recycle and/or sell their used mobile phones using self-service kiosks located in malls, retail stores, or other publically accessible areas. Such kiosks are operated by ecoATM, Inc., the assignee of the present application, and are disclosed in, for example, U.S. Pat. Nos. 8,463,646, 8,423,404, 8,239,262, 8,200,533, 8,195,511, and 7,881,965, which are commonly owned by ecoATM, Inc. and are incorporated herein by reference in their entireties.

There continues to be a need for improving the means available to consumers for recycling or reselling their mobile phones and other electronic devices. Simplifying the recycling/reselling process, enhancing the consumer experience, and discouraging fraud can incentivize consumers to dispose of their old electronic devices in an efficient and environmentally conscientious way.

DETAILED DESCRIPTION

Figure 1:
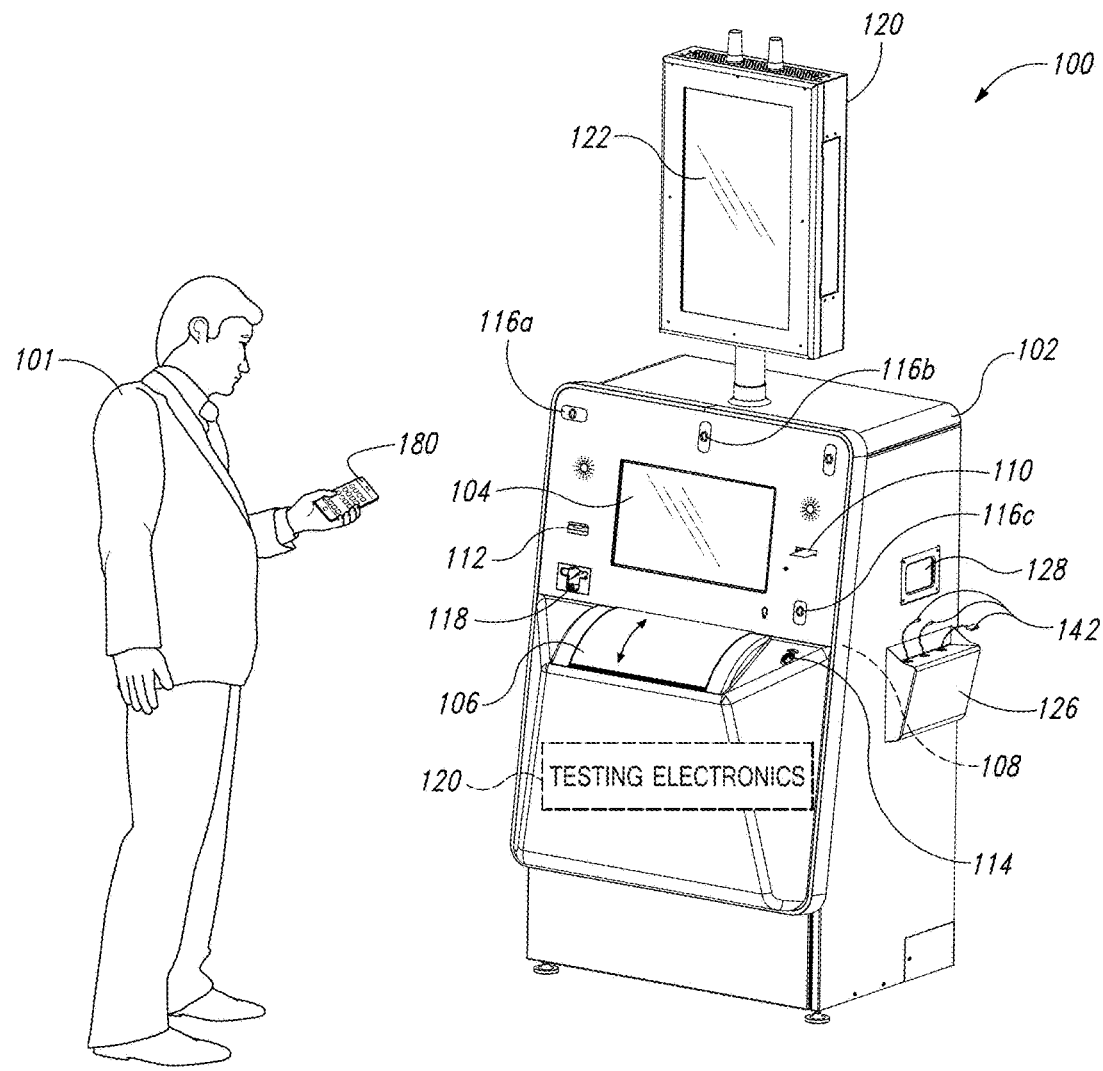
FIG. 1 is an isometric view of a kiosk for reselling, recycling, and/or other processing of mobile devices and other consumer electronic devices in accordance with an embodiment of the present technology.

When purchasing a used electronic device, it can be important for a purchaser to inspect the device to identify any issues that may affect the value of the device. For example, when purchasing a mobile phone, it can be important to determine if the phone has been damaged, if the phone has significant wear and tear, or if the phone has been reported stolen. In the case of a transaction executed via a consumer-operated kiosk, carrying out this inspection can be significantly more challenging than it would be in the case of a person-to-person transaction. Furthermore, testing internal hardware of an electronic device at a consumer-operate kiosk can also be relatively difficult. For example, conventional consumer-operated kiosks at least typically cannot readily power on a phone, operate a phone's camera, scroll through display menus on a phone, or otherwise operate a phone in a way that would cause problems with the phone's internal hardware to become apparent. As such, conventional consumer-operated kiosks may fail to detect defective internal hardware on a phone. There is a risk, therefore, that a conventional consumer-operated kiosk may valuate a non-working or disabled phone for significantly more than the phone is worth. There is also a risk that a conventional consumer-operated kiosk may mistake a dummy or decoy phone for a real phone. For at least these reasons, there is a need for technology that facilitates automated inspection of electronic devices, including automated inspection of internal hardware of electronic devices.

Systems, devices, and methods in accordance with embodiments of the present technology can at least partially address one or more of the problems described above and/or other problems associated with conventional technologies whether or not stated herein. For example, self-service kiosks in accordance with at least some embodiments of the present technology include testing electronics that can electrically connect to a mobile device and perform electrical measurements on the device. Such measurements can quantify electrical attributes of one or more hardware components of the mobile device. The electrical attributes can include, for example, power, electrical current, voltage, or other unique or distinctive attributes (e.g., resistance, capacitance, etc.) of the device's individual hardware components and/or collective groupings of hardware components (e.g., a memory and a processor). In at least some embodiments, the kiosk can use the electrical measurement to valuate, identify, and/or authenticate the device. For example, in one embodiment described in greater detail below, the kiosk can compare the current drawn on a phone's power line to detect if the charging circuit is working properly.

Certain details are set forth in the following description and in FIGS. 1-7 to provide a thorough understanding of various embodiments of the present technology. In other instances, well-known structures, materials, operations, and/or systems often associated with smartphones and other handheld devices, consumer electronic devices, computer hardware, software, and network systems, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is an isometric view of a kiosk 100 for recycling and/or other processing of mobile devices (e.g., smartphones) and other consumer electronic devices in accordance with the present technology. In the illustrated embodiment, the kiosk 100 is a floor-standing self-service kiosk configured for use by a user 101 (e.g., a consumer, customer, etc.) to recycle, sell, and/or perform other operations with a mobile phone or other consumer electronic device. In other embodiments, the kiosk 100 can be configured for use on a countertop or a similar raised surface. Although the kiosk 100 is configured for use by consumers, in various embodiments the kiosk 100 and/or various portions thereof can also be used by other operators, such as a retail clerk or kiosk assistant to facilitate the selling or other processing of mobile phones and other electronic devices. As described in greater detail below, the kiosk 100 includes testing electronics 120 (shown schematically) and a plurality of electrical connectors (e.g., USB cables; not shown) coupled to the testing electronics 120. In use, the user 101 can connect a mobile device 180 to one of the electrical connectors, and the testing electronics 120 can electrically test the mobile device 180 over the electrical connector. As described below, the kiosk 100 can use the electrical measurement to assess the condition and/or functionality of the mobile device's electrical hardware components (e.g., internal circuity, a display, a battery, etc.), and the kiosk 100 can use the assessment to determine an appropriate purchase price to offer the consumer for the mobile device 180.

As used herein, and for ease of reference, the term "processing" generally refers to all manner of services and operations that may be performed or facilitated by the kiosk 100 on, with, or otherwise in relation to an electronic device. Such services and operations can include, for example, selling, reselling, recycling, donating, exchanging, identifying, evaluating, pricing, auctioning, decommissioning, transferring data from or to, reconfiguring, refurbishing, etc. mobile phones and other electronic devices. Although many embodiments of the present technology are described herein in the context of mobile phones, aspects of the present technology are not limited to mobile phones and generally apply to other consumer electronic devices. Such devices include, as non-limiting examples, all manner of mobile phones, smart phones, handheld devices, PDAs, MP3 players, tablet, notebook and laptop computers, e-readers, cameras, etc. In some embodiments, it is contemplated that the kiosk 100 can facilitate selling and/or otherwise processing larger consumer electronic devices, such as desktop computers, TVs, game consoles, etc., as well smaller electronic devices such as Google Glass™, smart-watches, etc. The kiosk 100 and various features thereof can be at least generally similar in structure and function to the kiosks and corresponding features described in U.S. Pat. Nos. 8,463,646, 8,423,404, 8,239,262, 8,200,533, 8,195,511, and 7,881,965; and in U.S. patent application Ser. Nos. 12/573,089, 12/727,624, 13/113,497, 12/785,465, 13/017,560, 13/438,924, 13/753,539, 13/658,825, 13/733,984, 13/705,252, 13/487,299 13/492,835, 13/562,292, 13/658,828, 13/693,032, 13/792,030, 13/794,814, 13/794,816, 13/862,395, 13/913,408, 14/498,763, 14/500,739, 62/059,129, 62/059,132. All of the patents and patent applications listed in the preceding sentence are commonly owned by the applicant of the present application, and they along with any other patents or patent applications identified herein are incorporated herein by reference in their entireties.

In the illustrated embodiment, the kiosk 100 includes a housing 102 that is approximately the size of a conventional vending machine. The housing 102 can be of conventional manufacture from, for example, sheet metal, plastic panels, etc. A plurality of user interface devices are provided on a front portion of the housing 102 for providing instructions and other information to users, and/or for receiving user inputs and other information from users. For example, the kiosk 100 can include a display screen 104 (e.g., a liquid crystal display (LCD)) or light emitting diode (LED) display screen, a projected display (such as a head-up display or a head-mounted device), and so on for providing information, prompts, etc. to users. The display screen 104 can include a touch screen for receiving user input and responses to displayed prompts. In addition or alternatively, the kiosk 100 can include a separate keyboard or keypad for this purpose. The kiosk 100 can also include an ID reader or scanner 112 (e.g., a driver's license scanner), a fingerprint reader 114, and one or more cameras 116 (e.g., digital still and/or video cameras, identified individually as cameras 116a-c). The kiosk 100 can additionally include output devices such as a label printer having an outlet 110, and a cash dispenser having an outlet 118. Although not identified in FIG. 1, the kiosk 100 can further include a speaker and/or a headphone jack for audibly communicating information to users, one or more lights for visually communicating signals or other information to users, a handset or microphone for receiving verbal input from the user, a card reader (e.g., a credit/debit card reader, loyalty card reader, etc.), a receipt or voucher printer and dispenser, as well as other user input and output devices. The input devices may include a touchpad, a pointing device, such as a mouse, a joystick, pen, game pad, motion sensor, scanner, eye direction monitoring system, etc. Additionally the kiosk 100 can also include a bar code reader, QR code reader, bag/package dispenser, a digital signature pad, etc. In the illustrated embodiment, the kiosk 100 additionally includes a header 124 having a display screen 122 for displaying marketing advertisements and/or other video or graphical information to attract users to the kiosk. In addition to the user interface devices described above, the front portion of the housing 102 also includes an access panel or door 106 located directly beneath the display screen 104. As described in greater detail below, the access door is configured to automatically retract so that the user 101 can place an electronic device (e.g., a mobile phone) in an inspection area 108 for automatic inspection by the kiosk 100.

A sidewall portion of the housing 102 can include a number of conveniences to help users recycle or otherwise process their mobile phones. For example, in the illustrated embodiment the kiosk 100 includes an accessory bin 128 that is configured to receive mobile device accessories that the user wishes to recycle or otherwise dispose of. Additionally, the kiosk 100 can provide a free charging station 126 with a plurality of electrical connectors 142 for charging a wide variety of mobile phones and other consumer electronic devices.

Figure 2B:
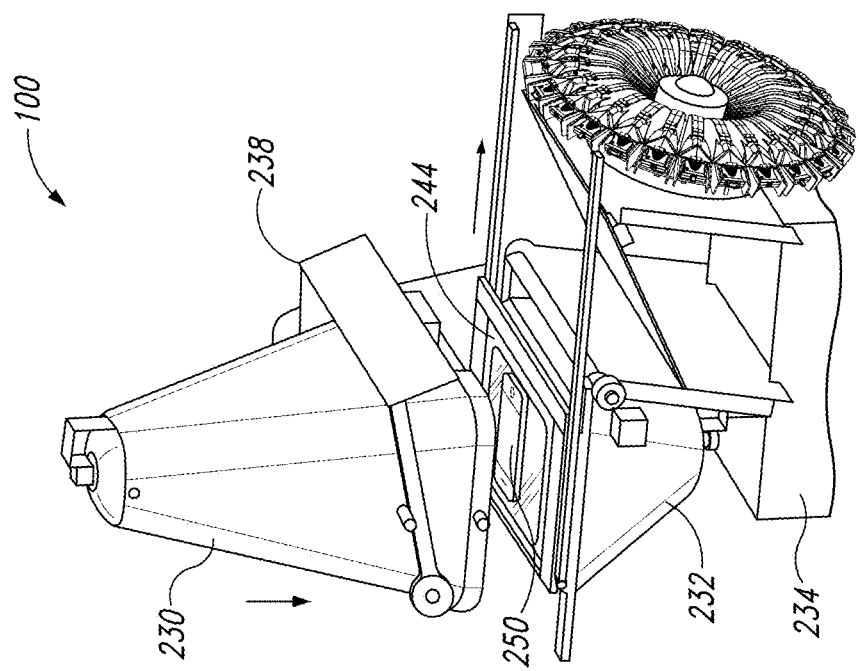
FIGS. 2A-2D are a series of isometric views of the kiosk of FIG. 1 with a number of exterior panels removed to illustrate operation of the kiosk in accordance with an embodiment of the present technology.
Figure 2A:
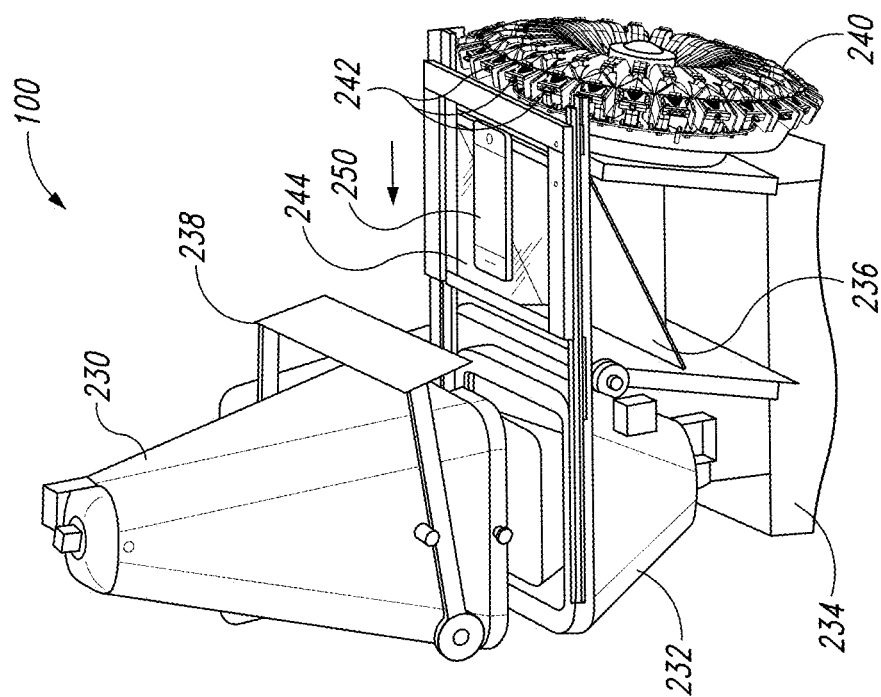

FIGS. 2A-2D are a series of isometric views of the kiosk 100 with the housing 102 removed to illustrate selected internal components configured in accordance with an embodiment of the present technology. Referring first to FIG. 2A, in the illustrated embodiment the kiosk 100 includes a connector carrier 240 and an inspection plate 244 operably disposed behind the access door 106 (FIG. 1). In the illustrated embodiment, the connector carrier 240 is a rotatable carrousel that is configured to rotate about a generally horizontal axis and carries a plurality of electrical connectors 242 (e.g., approximately 25 connectors), distributed around an outer periphery thereof. In other embodiments, other types of connector carrying devices (including both fixed and movable arrangements) can be used. In some embodiments, the connectors 242 can include a plurality of interchangeable universal serial bus (USB) connectors configured to provide power and/or exchange data with a variety of different mobile phones and/or other electronic devices. In operation, the connector carrier 240 is configured to automatically rotate about its axis to position an appropriate one of the connectors 242 adjacent to an electronic device, such as a mobile phone 250, that has been placed on the inspection plate 244 for recycling. The connector 242 can then be manually and/or automatically withdrawn from the connector carrier 240 and connected to a port on the mobile phone 250 for electrical analysis. Such analysis can include, e.g., an evaluation of make, model, configuration, condition, etc. using one or more of the methods and/or systems described in detail in the commonly owned patents and patent applications identified herein and incorporated by reference in their entireties.

In the illustrated embodiment, the inspection plate 244 is configured to translate back and forth (on, e.g., parallel mounting tracks) to move an electronic device, such as the mobile phone 250, between a first position directly behind the access door 106 and a second position between an upper chamber 230 and an opposing lower chamber 232. Moreover, in this embodiment the inspection plate 244 is transparent, or at least partially transparent (e.g., formed of glass, Plexiglas, etc.) to enable the mobile phone 250 to be photographed and/or otherwise optically evaluated from all, or at least most viewing angles (e.g., top, bottom, sides, etc.) using, e.g., one or more cameras, mirrors, etc. mounted to or otherwise associated with the upper and lower chambers 230 and 232. When the mobile phone 250 is in the second position, the upper chamber 230 can translate downwardly to generally enclose the mobile phone 250 between the upper chamber 230 and the lower chamber 232. The upper chamber 230 is operably coupled to a gate 238 that moves up and down in unison with the upper chamber 230. As noted above, in the illustrated embodiment the upper chamber 230 and/or the lower chamber 232 can include one or more cameras, magnification tools, scanners (e.g., bar code scanners, infrared scanners, etc.) or other imaging components (not shown) and an arrangement of mirrors (also not shown) to view, photograph and/or otherwise visually evaluate the mobile phone 250 from multiple perspectives. In some embodiments, one or more of the cameras and/or other imaging components discussed above can be movable to facilitate device evaluation. The inspection area 108 can also include weight scales, heat detectors, UV readers/detectors, and the like for further evaluation of electronic devices placed therein. The kiosk 100 can further include an angled binning plate 236 for directing electronic devices from the transparent plate 244 into a collection bin 234 positioned in a lower portion of the kiosk 100.

Figure 2D:
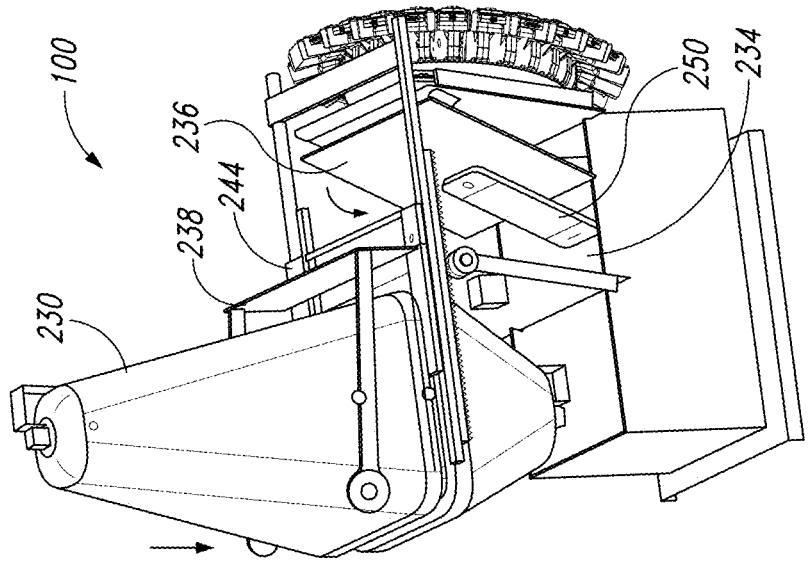

The kiosk 100 can used in a number of different ways to efficiently facilitate the recycling, selling and/or other processing of mobile phones and other consumer electronic devices. Referring to FIGS. 1-2D together, in one embodiment a user wishing to sell a used mobile phone, such as the mobile phone 250, approaches the kiosk 100 and identifies the type of device the user wishes to sell in response to prompts on the display screen 104. Next, the user may be prompted to remove any cases, stickers, or other accessories from the device so that it can be accurately evaluated. Additionally, the kiosk 100 may print and dispense a unique identification label (e.g., a small adhesive-backed sticker with a QR code, barcode, etc.) from the label outlet 110 for the user to adhere to the back of the mobile phone 250. After this is done, the door 106 retracts allowing the user to place the mobile phone 250 onto the transparent plate 244 in the inspection area 108 (FIG. 2A). The door 106 then closes and the transparent plate 244 moves the phone 250 under the upper chamber 230 as shown in FIG. 2B. The upper chamber 230 then moves downwardly to generally enclose the mobile phone 250 between the upper and lower chambers 230 and 232, and the cameras and/or other imaging components in the upper and lower chambers 230 and 232 perform a visual inspection of the phone 250. In some embodiments, the visual inspection can include a 3D visual analysis to confirm the identification of the mobile phone 250 (e.g. make and model) and/or to evaluate or assess the condition and/or function of the phone 250 and/or its various components and systems. For example, the visual analysis can include an inspection of a display screen on the phone 250 for cracks or other damage. In some embodiments, the kiosk 100 can perform the visual analysis using one or more of the methods and/or systems described in detail in the commonly owned patents and patent applications identified herein and incorporated by reference in their entireties.

Figure 2C:
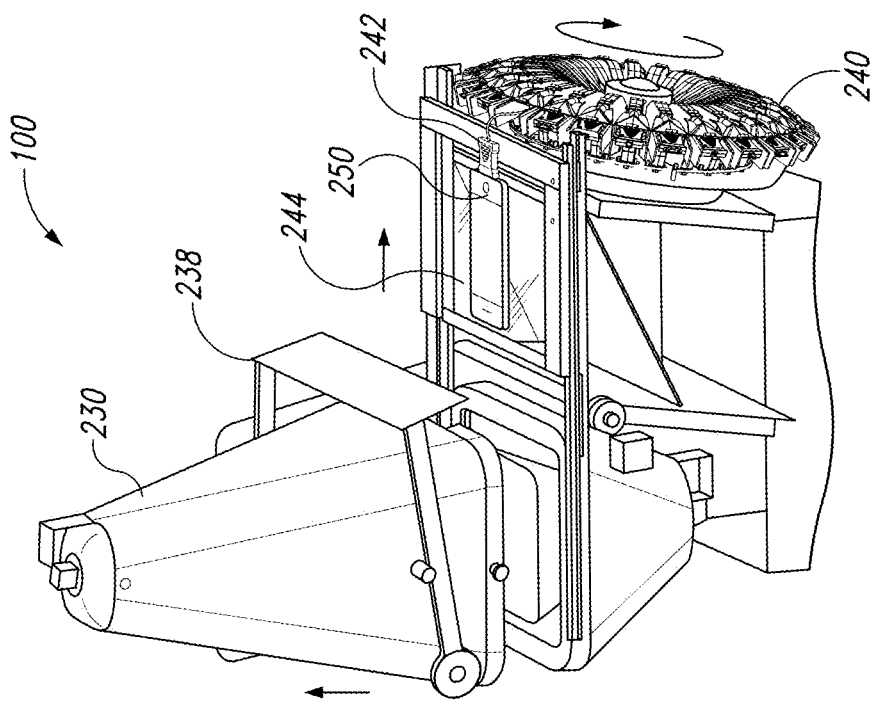

Referring next to FIG. 2C, after the visual analysis is performed and the device has been identified, the upper chamber 230 returns to its upper position and the transparent plate 244 returns the phone 250 to its initial position next to the door 106. The display screen 104 can also provide an estimated price or an estimated range of prices that the kiosk 100 may offer the user for the phone 250 based on the visual analysis, and/or based on user input (e.g., input regarding the type, condition, etc. of the phone 250). If the user wishes to proceed with the transaction, the connector carrier 240 automatically rotates an appropriate one of the connectors 242 into position adjacent the transparent plate 244, and door 106 is again opened. The user can then be instructed (via, e.g., the display screen 104) to withdraw the connector 242 (and its associated wire) from the connector carrier 240, plug the connector 242 into the corresponding port (e.g., a USB port) on the phone 250, and reposition the phone 250 in the inspection area on the transparent plate 244. After doing so, the door 106 once again closes and the kiosk 100 performs an electrical inspection of the device to further evaluate the condition of the phone.

In some embodiments, the user may be prompted to place his or her identification (e.g., a driver's license) in the ID scanner 112 and provide a thumbprint via the fingerprint reader 114. As a fraud prevention measure, the kiosk 100 can be configured to transmit an image of the driver's license to a remote computer screen, and an operator at the remote computer can visually compare the picture (and/or other information) on the driver's license to the person standing in front of the kiosk 100 as viewed by one or more of the cameras 116a-c (FIG. 1) to confirm that the person attempting to sell the phone 250 is in fact the person identified by the driver's license. In some embodiments, one or more of the cameras 116a-c can be movable to facilitate viewing of kiosk users, as well as other individuals in the proximity of the kiosk 100. Additionally, the person's fingerprint can be checked against records of known fraud perpetrators. If either of these checks indicate that the person selling the phone presents a fraud risk, the transaction can be declined and the phone 250 returned.

After the visual and electronic analysis of the mobile phone 250 and verification of the user, the user is presented with a phone purchase price via the display screen 104. If the user declines the price (via, e.g., the touch screen), a retraction mechanism (not shown) automatically disconnects the connector 242 from the phone 250, the door 106 opens, and the user can reach in and retrieve the phone 250. If the user accepts the price, the door 106 remains closed and the transparent plate 244 moves back toward the upper and lower chambers 230 and 232. As shown in FIG. 2D, however, when the upper chamber 230 is in the lower position the gate 238 permits the transparent plate 244 to slide underneath but not electronic devices carried thereon. As a result, the gate 238 knocks the phone 150 off of the transparent plate 244, onto the binning plate 236 and into the bin 234. The kiosk can then provide payment of the purchase price to the user. In some embodiments, payment can be made in the form of cash dispensed from the cash outlet 118. In other embodiments, the user can receive remuneration for the mobile phone 150 in various other useful ways. For example, the user can be paid via a redeemable cash voucher, a coupon, an e-certificate, a prepaid card, a wired or wireless monetary deposit to an electronic account (e.g., a bank account, credit account, loyalty account, online commerce account, mobile wallet, etc.), Bitcoin, etc.

As those of ordinary skill in the art will appreciate, the foregoing routine is but one example of a way in which the kiosk 100 can be used to recycle or otherwise process consumer electronic devices, such as mobile phones. Although the foregoing example is described in the context of mobile phones, it should be understood that kiosk 100 and various embodiments thereof can also be used in a similar manner for recycling virtually any consumer electronic device, such as MP3 players, tablet computers, PDAs, and other portable devices, as well as other relatively non-portable electronic devices such as desktop computers, printers, devices for playing games, entertainment or other digital media on CDs, DVDs, Blu-ray, etc. Moreover, although the foregoing example is described in the context of use by a consumer, the kiosk 100 in various embodiments thereof can similarly be used by others, such as store clerk, to assist consumers in recycling, selling, exchanging, etc. their electronic devices.

Figure 3:
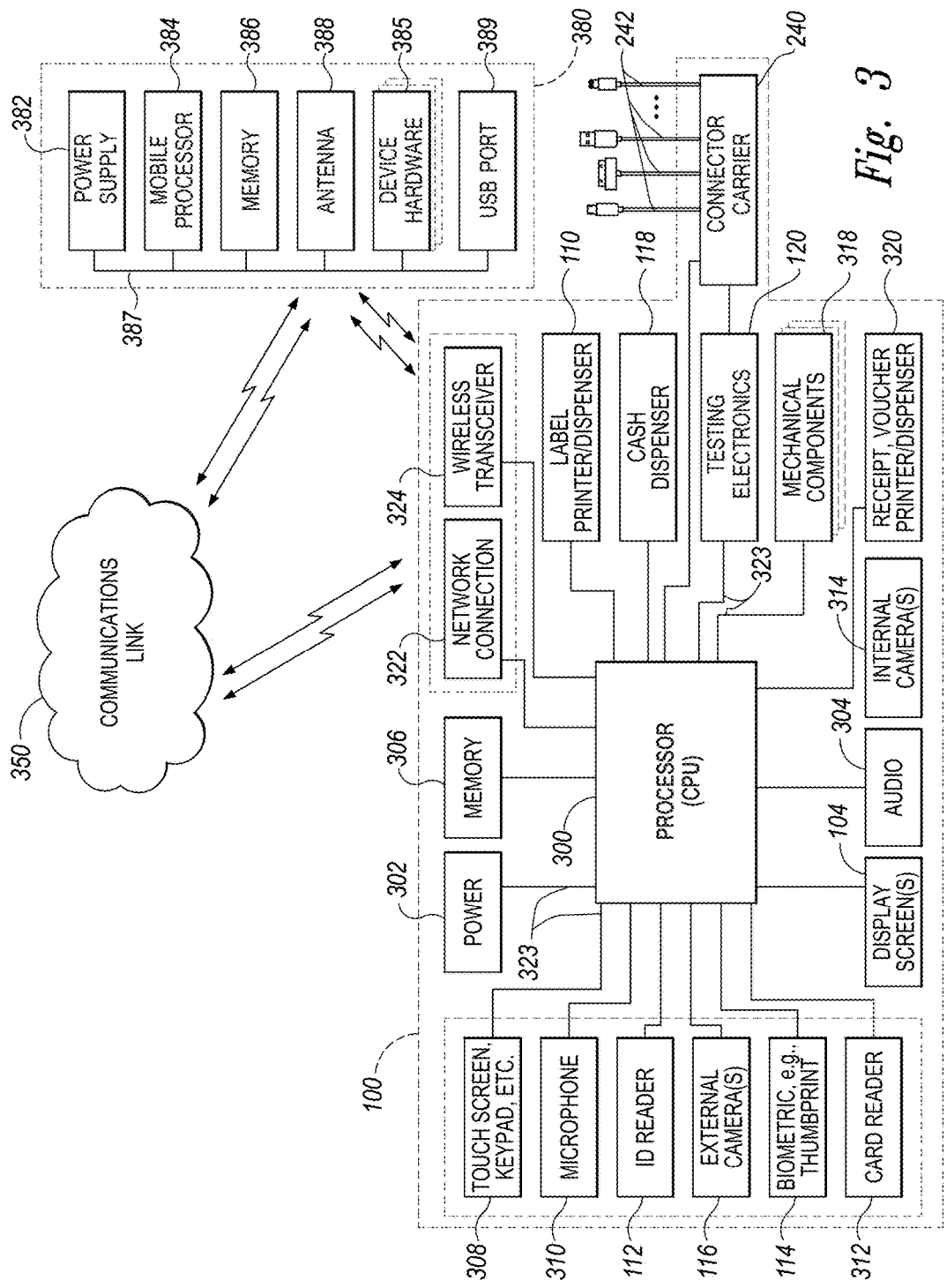
FIG. 3 is a schematic diagram illustrating various components associated with the kiosk of FIG. 1.

FIG. 3 provides a schematic representation of an architecture of the kiosk 100 in accordance with an embodiment of the present technology. In the illustrated embodiment, the kiosk 100 includes a suitable processor or central processing unit (CPU) 300 that controls operation of the kiosk 100 in accordance with computer-readable instructions stored on system memory 306. The CPU 300 may be any logic processing unit, such as one or more CPUs, digital signal processors (DSPs), application-specific integrated circuits (ASICs), etc. The CPU 300 may be a single processing unit or multiple processing units in a device or distributed across multiple devices. The CPU 300 is connected to the memory 306 and may be coupled to other hardware devices, for example, with the use of a bus (e.g., a PCI Express or Serial ATA bus). The CPU 300 can include, by way of example, a standard personal computer (PC) (e.g., a DELL OPTIPLEX 7010 PC) or other type of embedded computer running any suitable operating system, such as Windows, Linux, Andoid, iOS, or an embedded real-time operating system. In some embodiments, the CPU 300 can be a small form factor PC with integrated hard disk drive (HDD) and USB ports to communicate with the other components of the kiosk 100. In other embodiments, the CPU 300 can include a microprocessor with a standalone motherboard that interfaces with a separate HDD. The memory 306 can include read-only memory (ROM) and random access memory (RAM) or other storage devices, such as disk drives or solid state drives (SSDs), that store the executable applications, test software, databases and other software required to, for example, control kiosk components, process electronic device information and data (to, e.g., evaluate device make, model, condition, pricing, etc.), communicate and exchange data and information with remote computers and other devices, etc.

The CPU 300 can provide information and instructions to kiosk users via the display screen 104 and/or an audio system (e.g., a speaker) 304. The CPU 300 can also receive user inputs via, e.g., a touchscreen 308 associated with the display screen 104, a keypad with physical keys, and/or a microphone 310. Additionally, the CPU 300 can receive personal identification and/or biometric information associated with users via the ID reader 112, one or more of the external cameras 116, and/or the fingerprint reader 114. In some embodiments, the CPU 300 can also receive information (such as user identification and/or account information)

via a card reader 312 (e.g., a debit, credit, or loyalty card reader having, e.g., a suitable magnetic stripe reader, optical reader, etc.). The CPU 300 can also control operation of the label dispenser 110 and systems for providing remuneration to users, such as the cash dispenser 118 and/or a receipt or voucher printer and an associated dispenser 320.

As noted above, the kiosk 100 additionally includes a number of electronic, optical and electromechanical devices for electrically, visually and/or physically analyzing electronic devices placed therein for recycling. Such systems can include one more internal cameras 314 for visually inspecting electronic devices for, e.g., determining external dimensions and condition, and one or more of the electrical connectors 242 for, e.g., powering up electronic devices and performing electronic analyses. As noted above, the cameras 314 can be operably coupled to the upper and lower chambers 230 and 232 (FIGS. 2A-2D), and the connectors 242 can be movably and interchangeably carried by the connector carrier 240. The kiosk 100 further includes a plurality of mechanical components 318 that are electronically actuated for carrying out the various functions of the kiosk 100 during operation. The mechanical components 318 can include, for example, the inspection area access door 106 and one or more of the movable components (e.g. the inspection plate 244, the upper and lower chambers 230 and 232, etc.) operably disposed within the inspection area 108 (FIG. 1). The kiosk 100 further includes power 302, which can include battery power and/or facility power for operation of the various electrical components associated with kiosk operation.

In the illustrated embodiment, the kiosk 100 further includes a plurality of physical interconnects 323 for enabling electrical communication between hardware components, such as signal buses, point to point connections, or both buses and point-to-point connections connected by appropriate bridges, hubs, adapters, or controllers. For example, the interconnects 323 can include a system bus, a USB bus, a Peripheral Component Interconnect (PCI) family bus, a HyperTransport or industry standard architecture (ISA) bus, a small computer system interface (SCSI) bus, and/or a IIC (I2C) bus, as well as various types of removable cables, including the electrical connectors 242.

As further shown in FIG. 3, the kiosk 100 also includes a network connection 322 (e.g., a wired connection, such as an Ethernet port, cable modem, FireWire cable, Lightning connector, USB port, etc.) suitable for communication with, e.g., all manner of remote processing devices via a communication link 350, and a wireless transceiver 324 (e.g., including a Wi-Fi access point, Bluetooth transceiver, near-field communication (NFC) device, and/or a wireless modem or cellular radio utilizing GSM, CDMA, 3G, and/or 4G technologies) for data communications suitable for communication with, e.g., all manner of remote processing devices via the communication link 350 and/or directly via, e.g., a wireless peer-to-peer connection. For example, the wireless transceiver 324 can facilitate wireless communication with handheld devices, such as a mobile device 380 ("e.g., a smart phone").

In the illustrated embodiment, the mobile device 380 includes a mobile device processor 384 ("mobile processor 384") configured to execute computer readable instructions stored in memory 386, such as instructions associated with an operating system (e.g., an Android operating system), device drivers (e.g., USB device driver), and user applications. The mobile device 380 also includes a power source 382 (e.g., a battery and a charging circuit) and a variety of device hardware 385, such as a camera; a speaker and a microphone for two-way communication and audio playback; input devices, including, for example, a touch screen, a keypad, etc.; and/or vibrator motor(s) for haptic feedback and notifying users of incoming messages and calls. In addition to the foregoing features, the mobile device 380 includes physical interconnects 387 (e.g., a USB bus); a USB port 389 for communication over a wired connection, such as wired connection with one of the electrical connectors; and a wireless transceiver 388 for wirelessly communicating with, for example, other mobile devices, websites, and the kiosk 100. Such communication can be performed via, e.g., the communication link 350 (which can include the Internet, a public or private intranet, a local or extended Wi-Fi network, cell towers, the plain old telephone system (POTS), etc.), direct wireless communication, etc.

Mobile Device Testing

Figure 4A:
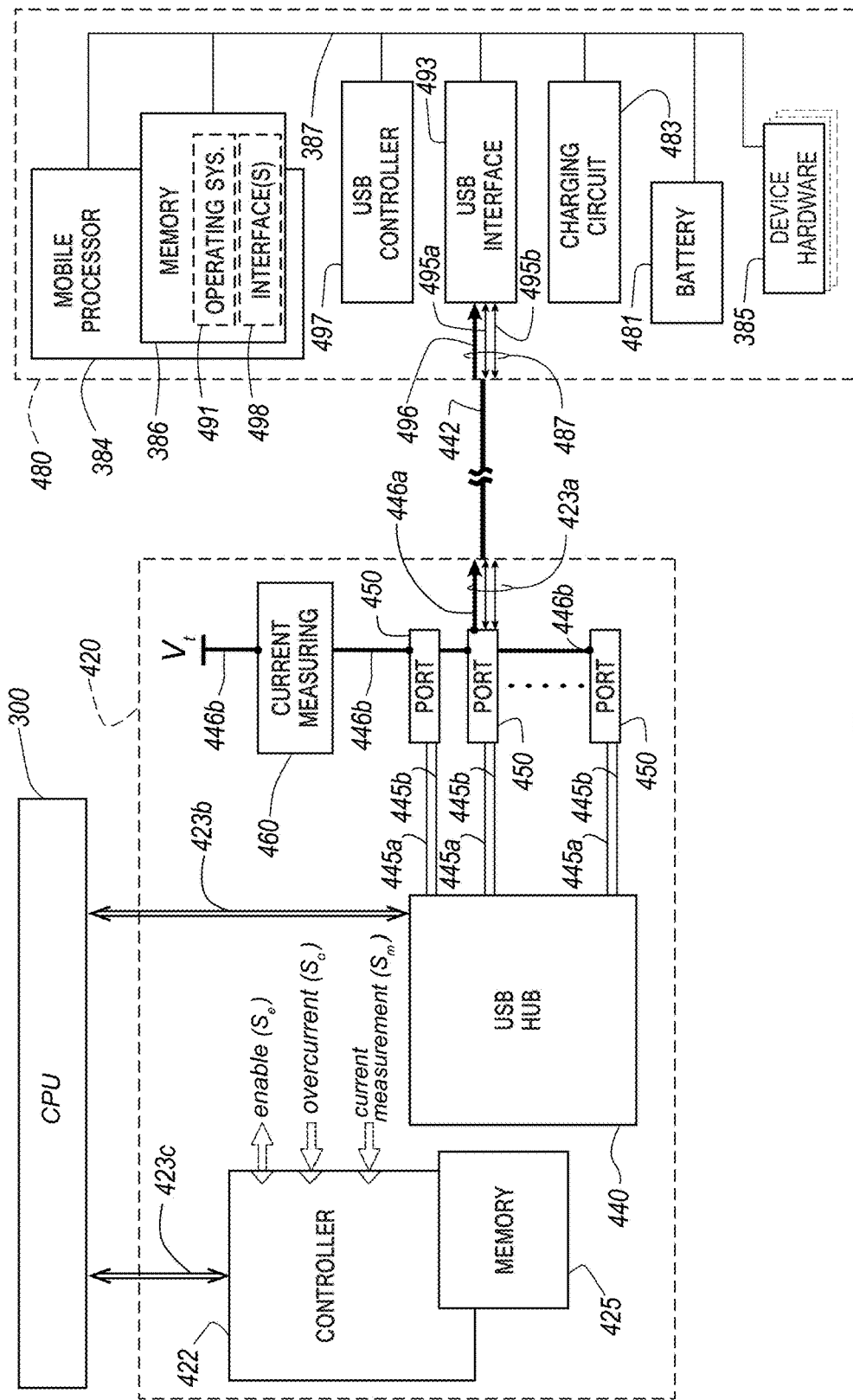
FIG. 4A is a schematic diagram of testing electronics of the kiosk of FIG. 1 in accordance with an embodiment of the present technology.

FIG. 4A is a schematic diagram of the testing electronics 120 in accordance with an embodiment of the present technology. In the illustrated embodiment, the testing electronics 120 are configured to communicate with a mobile device 480 (e.g., a smart phone) using a USB standard, such as one of the USB 2.0, USB 3.0, or USB SuperSpeed standards, although in other embodiments the testing electronics 120 and the mobile device 480 can communicate in accordance with other standards, such as an Institute of Electrical and Electronics Engineers (IEEE) standard 1394, sometimes referred to as a "Firewire."

As shown, the testing electronics 120 are connected to the mobile device 480 by an individual electrical connector 442 (shown schematically) of the plurality of electrical connectors 242 (FIG. 2C). The mobile device 480 includes a USB device bus 487 ("device bus 487") connected to the electrical connector 442 via the USB port 389 (not shown). The device bus 487 includes a power line 496 and data lines 495a-b that interface with a USB interface 493. The USB interface 493 couples the power line 496 to a charging circuit 483 that is in turn coupled to a battery 481. The charging circuit 483 is configured to provide power to the mobile device 480, either from the battery 481 or directly from the power line 496. The charging circuit 483 also charges the battery 481 from the power line 496.

The USB interface 495 also couples the data lines 495a-b to a USB controller 497. The USB controller 497 monitors the data lines 495a-b and controls data communication between the mobile processor 384 and a host device (e.g., the CPU 300). The mobile processor 384 controls the overall operation of the mobile device 480 and executes operating system software 491 stored in the memory 386, such as a flash memory, ROM, and/or RAM. The operating system 491 manages system resources, such as the device hardware components 385 (e.g., a touchscreen, a camera, the USB controller 497, the charging circuit 483, etc.), and provides software interfaces 498 to these resources, such as a shell interface, an application programming interface (API), a USB interface, a debugging interface, etc. For example, a software interface can enable the operating system 491 to communicate with the charging circuit 483 to determine a charge state of the battery 481, and to then display the charge state to a user at the mobile device's touchscreen (not shown).

When the mobile device 480 is connected to the testing electronics 120, the CPU 300 can communicate directly with the mobile device 480 to, e.g., upload data, install software, power on the mobile device 480, etc. In the illustrated embodiment, the CPU 300 is coupled to the mobile device 480 over a signal path that includes the electrical connector 442, a first USB host bus 423a ("first host bus 423a")

coupled to the connector 442, a USB hub 440 coupled to the first host bus, and a second USB host bus 423b ("second host bus 423b") coupled to the USB hub 440. As shown, the first host bus 423a includes a first power line 446a that is coupled to the mobile device's power line 496, and a pair of data lines 445a-b (e.g., a twisted pair) that couples the USB hub 440 to the mobile device's data lines 495a-b. In general, the USB hub 440 can function in a manner similar to that of a traditional hub by providing a common signal bus to which each set data lines 445a-b of the corresponding electrical connectors 242 (FIG. 2C) can be connected.

As further shown in FIG. 4A, a port circuit 450 is coupled to the first power line 446a, a second power line 446b, and to each set of data lines 445a-b. The second power line 446b is coupled to a current measuring circuit 460 and a voltage supply source (not shown) that is configured to supply a test voltage, $V_t$ on the second power line 496. In one embodiment, the test voltage $V_t$ can be a 5V DC voltage (e.g., a USB Vbus voltage). As described in greater detail below, the testing electronics 120 further include a controller 422 configured to output an enable signal, $S_e$, to the port circuits 450, to receive overcurrent signals, $S_o$, from the port circuits 450, and to receive a current measurement signal, $S_m$, from the current measuring circuit 460.

Figure 4B:
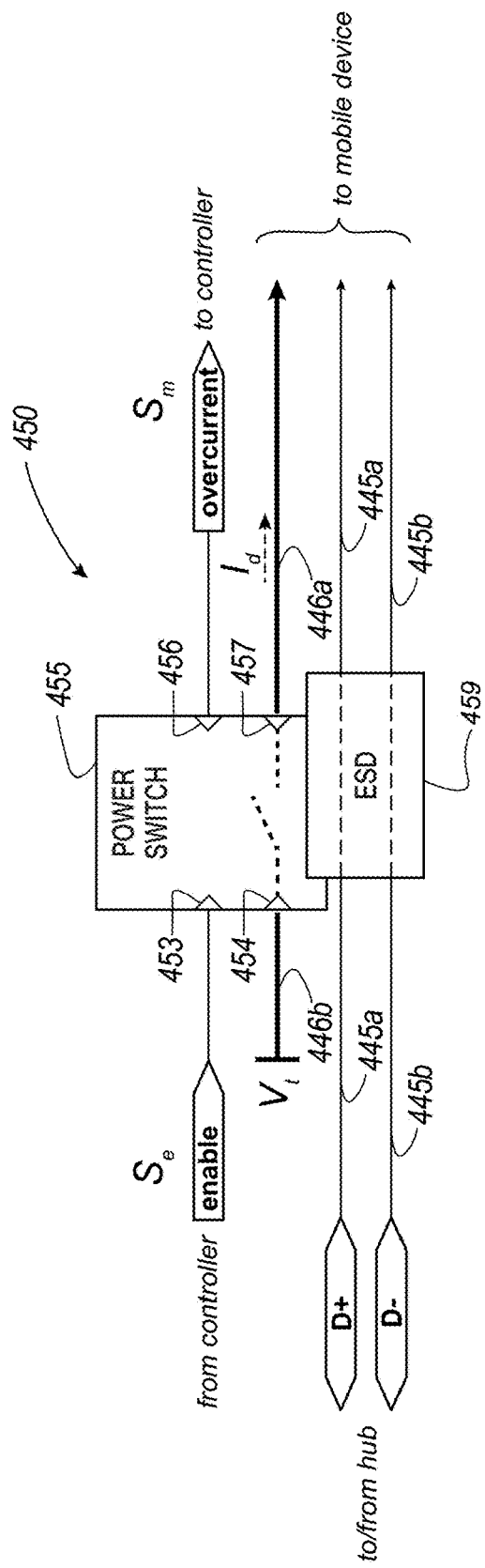
FIGS. 4B and 4C show a port circuit and a current measuring circuit, respectively, of the testing electronics in further detail.

FIG. 4B is a schematic diagram that shows one of the port circuits 450 in further detail. As shown, the port circuit 450 includes a power switch 455 with an enable pin 453 coupled to an enable output of the controller 422 (FIG. 4A), an overcurrent pin 456 coupled to an overcurrent input of the controller 422, a power input pin 454 coupled to the second power line 446b, and a power output pin 457 coupled to the first power line 446a. The port circuit 450 also includes an electrostatic discharge (ESD) device 459 coupled to the data lines 445a-b and configured to protect upstream circuits, such as the USB hub 440 (FIG. 4A), from electrical power surges on the mobile device's data lines 495a-b (FIG. 4A).

In operation, the power switch 455 closes when it receives the enable signal $S_e$ from the controller 422, which connects the second power line 446b with the first power line 446a. The mobile device 480 (FIG. 4A), in turn, draws a device current, $I_d$, over the power lines 446a-b and the device bus power line 496 (FIG. 4A). In one embodiment, the test voltage source (not shown) can regulate the output power drawn from the power lines 446a-b in unit load increments of device current (e.g., 1-5 unit load increments of 100 mA, outputting, e.g., up to 2.5 W, or 1-6 unit load increments of 150 mA, outputting, e.g., up to 4.5 W).

In the illustrated embodiment, if the mobile device 480 draws too much power, the power switch 455 sends the overcurrent signal $S_o$ to the controller 422, and the controller 422 opens the power switch 455 (e.g., by removing the enable signal $S_e$) to disconnect the second power line 446b from the first power line 446a, thereby preventing power surges or power drains on the second power line 446b that might cause damage to upstream circuitry, such as the current measuring circuit 460 (FIG. 4A).

Figure 4C:
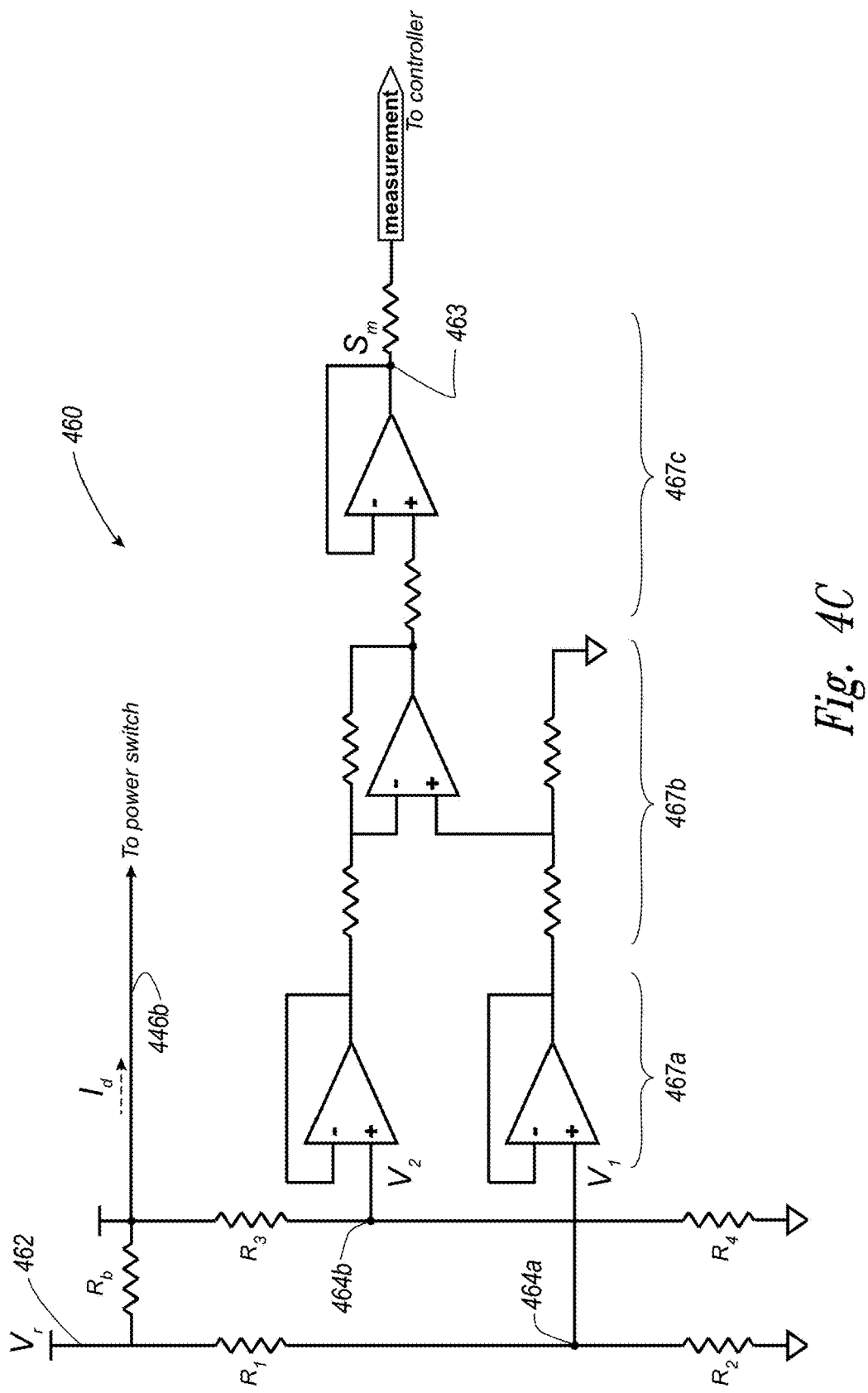

FIG. 4C is a schematic diagram showing the current measuring circuit 460 in further detail. As shown, the current measuring circuit 460 includes a first input node 464a that inputs a first voltage, $V_1$; a second input node 464b that inputs a second voltage, $V_2$; first through third amplifier stages 467a-467c coupled to the input nodes 464a-b; and an output node 463 that outputs the current measurement signal $S_m$ to the controller 422 (FIG. 4A). As further shown in FIG. 4C, a bridging resistor $R_B$ connects the second power line 446b to a reference line 462 that is in turn connected to a voltage reference source (not shown) having a reference voltage $V_r$ (e.g., Vcc). The first input node 464a is coupled to the reference line 462 and circuit ground by pull-up and pull-pull down resistors $R_1$ and $R_2$, respectively, and the second input node 464b is coupled to the second power line 446b and circuit ground by pull-up and pull-down resistors $R_3$ and $R_4$, respectively.

In operation, the current measuring circuit 460 applies the test voltage $V_t$ across the pull-up and pull down resistors $R_3$ and $R_4$, which produces a voltage difference between the input nodes 464a-b (i.e., $V_1-V_2$) that is proportional to the magnitude of the device current $I_d$. When the voltage difference is relatively large (i.e., when the device current $I_d$ is large), the gain at the second stage 467b is relatively high, and so is the current measurement signal $S_m$. However, when the voltage difference between the input nodes 464a-b is relatively small (i.e., when the device current $I_d$ is small), the gain is relatively low, and so is the current measurement signal $S_m$. By way of example only, the current measurement signal $S_m$ may include measured voltages in the range of 0 to 5V, and may correspond to device currents in the range of 0 to 1000 mA. For example, output voltages of 1 V, 2.5 V, and 4V may correspond to device currents of 200 mA, 500 mA, and 800 mA, respectively.

Referring again to FIG. 4A, the controller 422 receives the current measurement signal $S_m$ from the current measuring circuit 460 and is configured to produce a test result by executing instructions stored in memory 425 (e.g., in firmware). In several embodiments, the controller 422 can produce a test result in the form of a score, a rating, or pass/fail indication by comparing the current measurement signal $S_m$ to one or more reference quantities stored in the memory 425 (using, e.g. a comparator, not shown). For example, the controller 422 can compare the current measurement signal $S_m$ to a threshold level of current.

In the illustrated embodiment of FIG. 4A, the controller 422 can relay a test result to the CPU 300 over a serial bus 423c. For example, in one embodiment, the controller 422 can be a peripheral interface controller (e.g., part number PIC18F87K22) from Microchip Technology, Inc. of Chandler, Ariz., which can send test results and measurements to the CPU 300 in the form of an RS 449 serial data signal. The controller 422 can also use the serial bus 423c to download data from the CPU 300, such as new test routines and updates to testing algorithms. In one aspect of this embodiment, the serial bus 423c provides a data path that is independent of the second host bus 423b and by which the controller 422 can communicate directly with the CPU 300. In another embodiment, the controller 422 does not produce a test result, but simply relays the current measurement signal $S_m$ to the CPU 300, such as in cases where the controller 422 does not have enough processing power to process the current measurement signal $S_m$.

As noted above, the electrical test results can be used by the kiosk 100 to determine the condition and/or functionality of one or more of hardware components of the mobile device 480. In the illustrated embodiment, the testing electronics 120 are configured to assess the condition and/or functionality of the charging circuit 483. In particular, the testing electronics 120 measure the amount of charge current (i.e., the device current $I_d$) that the charging circuit 483 draws on the power lines 446a-b and 496, and the testing electronics 120 use the corresponding current measurement signal $S_m$ to determine whether the charging circuit 483 is functional or damaged. In general, charging circuits can become damaged by static discharge or when they are overheated, exposed to water, or connected to a non-standard power supply. If a charging circuit is damaged, it might not regulate charge current properly (if at all), which can cause damage to a battery. For example, a damaged charging circuit might have a slow charge rate or a very rapid charge rate. In many cases, a charging circuit is difficult and expensive, if not impossible, to replace because it is typically located on a primary circuit board or co-located on a processor chip. Thus, a mobile device with a damaged charging circuit may have little market value due to the impracticability of replacing the charging circuit.

In the illustrated embodiment, if the charging circuit 483 is damaged, the current measurement signal $S_M$ may indicate that the charge current is either too high or too low. For example, if the charge current is low or negligible, the charging circuit 483 may be open circuited. Alternately, if the charge current is large, the charging circuit 483 may be short circuited. In some embodiments, an electrical test can detect whether a charging circuit is damaged by determining if the current is below a maximum current threshold, $I_{max}$, (e.g., 1.5 A), above a minimum current threshold, $I_{min}$, (e.g., 200 mA), or within a range that falls between the maximum and minimum current thresholds $I_{max}$ and $I_{min}$. The testing electronics 120 can also measure other types of electrical quantities associated with the charge current, such as AC frequency or DC pulse widths. For example, in some mobile devices, the charge current may begin to pulse when the battery is fully charged. In an additional or alternate embodiment, the testing electronics 120 can apply an AC test voltage to test capacitors, transistors, or other reactive circuit elements of mobile device hardware.

In some embodiments, the controller 422 can compare the current measurement signal $S_M$ to reference quantities corresponding to the electrical characteristics of a particular make and/or model of mobile device. For example, the controller 422 can look up device signatures in a look-up table stored in the memory 425. The reference quantities in the device signature can include, for example, the charge current thresholds $I_{max}$ and $I_{min}$, the amount of power that the device is supposed to draw on the power line 496, the expected impedance between the power line 496 and circuit ground, and/or other known reference quantities associated with particular types of makes and/or model of mobile devices.

Figure 5A:
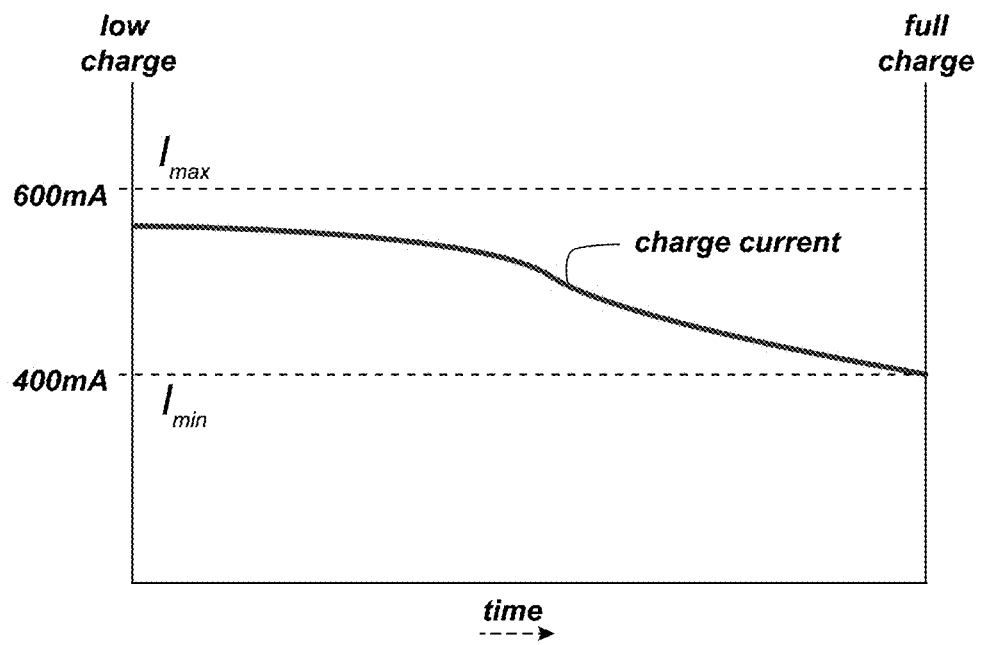
FIGS. 5A and 5B are diagrams representing charge current profiles of two different mobile devices.
Figure 5B:
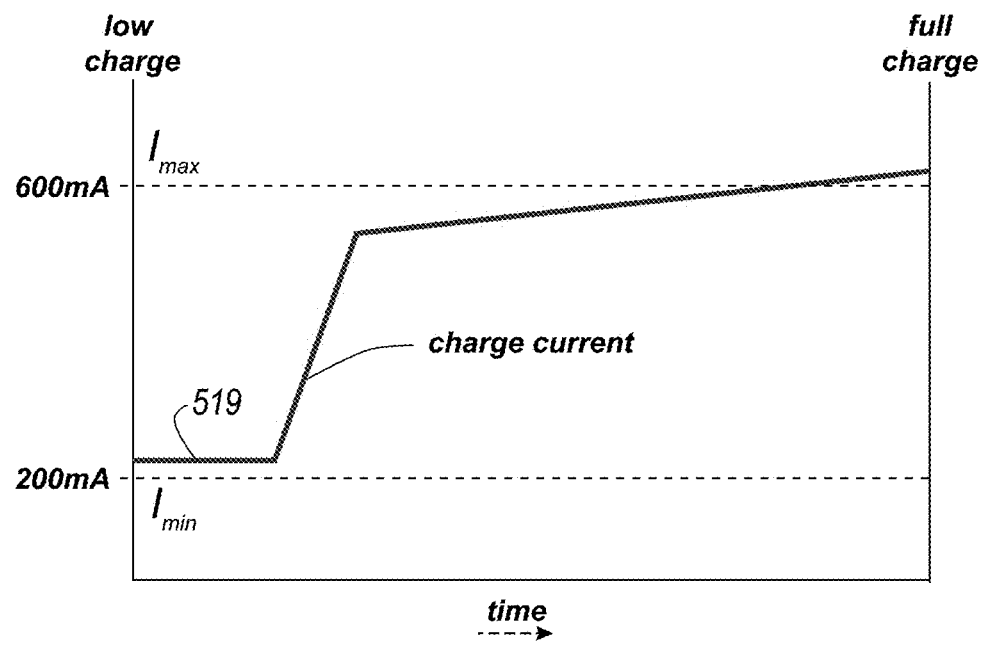

In several embodiments, the reference quantities can be based on a charge current profile of a particular make and/or model of a mobile device. By way of example, FIGS. 5A and 5B are diagrams representing charge current profiles of two different mobile devices. In the device of FIG. 5A, the charge current decreases as the battery charges from a low charge level to a high charge level, while the charge current in FIG. 5B increases as the battery charges. In one embodiment, the testing electronics 120 can compare the current measurement signal $S_m$ to the slope of a charge current profile. For example, the testing electronics 120 can sample the current over a time interval of several seconds or minutes to determine an average slope of the charge current. In another embodiment, the testing electronics 120 can use the slope of the charge current to determine the charge state of the battery. In FIG. 5B, for example, the flatline portion 519 of the curve can indicate that the battery of the mobile device has a low charge.

In a related embodiment, the testing electronics 120 can help thwart unscrupulous users who attempt to defraud the kiosk 100 with a "dummy device." Typically, a dummy device will include an inexpensive mobile device casing or shell, which has the appearance of functional device, but is devoid of internal hardware components. A dummy device can be rigged within an inexpensive controller chip/transmitter programmed to emulate a genuine mobile device. Such a dummy device may only cost a fraction of the cost of the device that it is emulating. Because the current measurement signal $S_m$ is generally analog in nature, it may be much more difficult to reproduce the analog signal using mere software programming. Instead, the dummy device would need specially designed and relatively more expensive circuitry to mimic the analog behavior of a mobile device. In some embodiments, the electrical measurements can also detect whether a mobile device has non-OEM hardware or has been otherwise modified from its original condition. For example, if a dummy device has been rigged with a resistive shunt (e.g., to mimic a charge current), the controller can determine if the charge current is a time varying signal or static, with the latter indicating that there could be a resistive shunt between the mobile device's power line 496 (FIG. 4A) and circuit ground.

Data Line Switching

Figure 6:
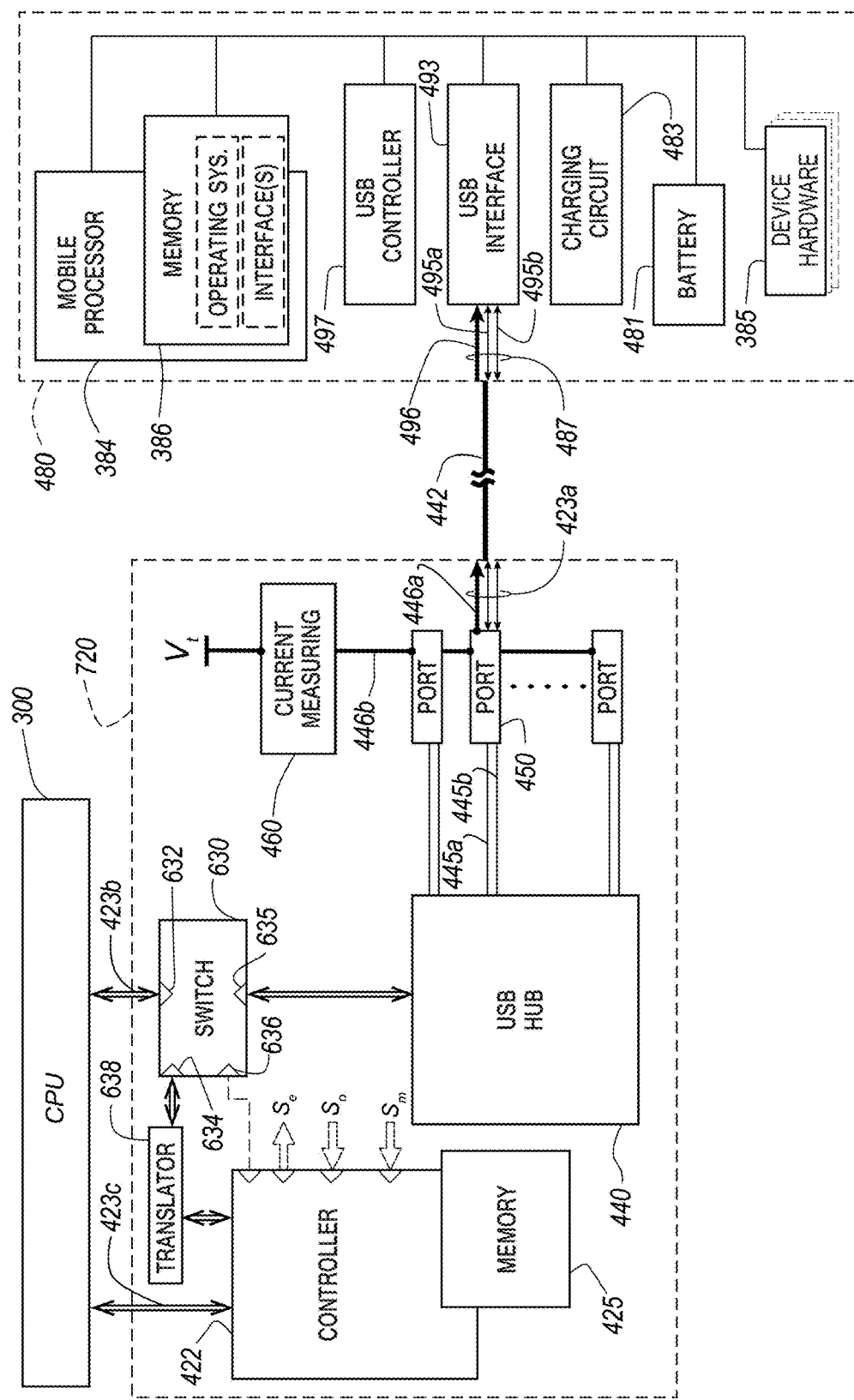
FIG. 6 is a schematic diagram of testing electronics in accordance with another embodiment of the present technology.

FIG. 6 is a schematic diagram of testing electronics 620 in accordance with another embodiment of the present technology. The testing electronics 620 can include features generally similar in function to those of the testing electronics 120 described in detail above. For example, the testing electronics 620 includes the controller 422, the USB hub 440, the port circuits 450, and the current measuring circuit 460. In the illustrated embodiment, of FIG. 6, the testing electronics 620 include a data switch circuit 630 ("data switch 630") having a toggle pin 636, a first switch port 632 coupled to the first host bus 423b, a second switch port 634 coupled to a translator circuit 638, and a third switch port 635 coupled to the USB hub 440. The controller 422 is configured to toggle the data switch 630 and to drive the translator circuit 638. For example, the controller 422 can drive the translator circuit 638 using RS232 signals, although in other embodiments the controller 422 can be configured to output USB signals, and the translator circuit 638 can be omitted in these embodiments. In one embodiment, the data switch 630 can be a high speed data switch (e.g., part number USB3740) from Microchip Technology, Inc. of Chandler, Ariz., and the translator circuit 638 can be a USB peripheral/host controller (e.g., part number MAX3421E) available from Maxim Integrated Products, Inc. of San Jose, Calif.

In operation, the controller 422 toggles the data switch between a first switch state and a second switch state. In the first switch state the first switch port 632 is connected to the third switch port 635 (and the second switch port 634 is disconnected from the switch port 635), and in the second switch state the second switch port 634 is connected to the third switch port 635 (and the first switch port 632 is disconnected from third switch port 635). When the switch is in the first switch state, the CPU 300 can communicate with the mobile device over the USB hub 440, such as to download and/or upload data to/from the mobile device 480. When the data switch 630 is in the second switch state, the controller 422 can communicate directly with the mobile device 480.

In one aspect of the illustrated embodiment of FIG. 6, the controller 422 can operate in a manner similar to that of USB host device. For example, the controller 422 can assign a unique address to the mobile device 480 and exchange USB packets directly with the mobile device 480. In a related aspect of this embodiment, the controller 422 can intermediate between the CPU 300 and the mobile device 480. For example, in one embodiment the controller 422 can request USB device descriptors from the mobile device, and the controller 422 can then forward the mobile device's VID/

PID to the CPU 300. In some embodiments, the controller 422 can drive all of the USB communications with the mobile device 480 on behalf of the CPU 300. One advantage that this can provide that it frees up system resources for the CPU 300. For example, the CPU 300 does not need to install the USB drivers for each of the numerous types of mobile devices that can be connected to the testing electronics 620. In at least some embodiments where the controller 422 intermediates for the CPU 300, the data switch 630 and the second host bus 423*b* may be omitted.

In some embodiments, the controller 422 can communicate directly with the mobile processor 384 to access the device's hardware components 385 over a debugging interface, such as the android debugging bridge (ADB) or over a hardware abstraction interface. In one embodiment, the controller 422 can use such interfaces to operate (e.g., activate, access, control, enable, and/or disable) hardware components, such as the mobile device's camera, display, memory, vibrator motor(s), etc. For example, the controller 422 can use a software interface to access the mobile device's memory 386 to retrieve an image and display the image on the mobile device's display screen. In another embodiment, the controller 422 can communicate with a so-called smart charging circuit, which has logic that enables the charging circuit to be turned on or off and/or to draw different levels of charge current. The controller 422 can also use shell access to identify hardware on the mobile device 480. For example, the controller 422 can use shell access to detect any non-OEM hardware that may have been installed on the mobile device 480.

Figure 7:
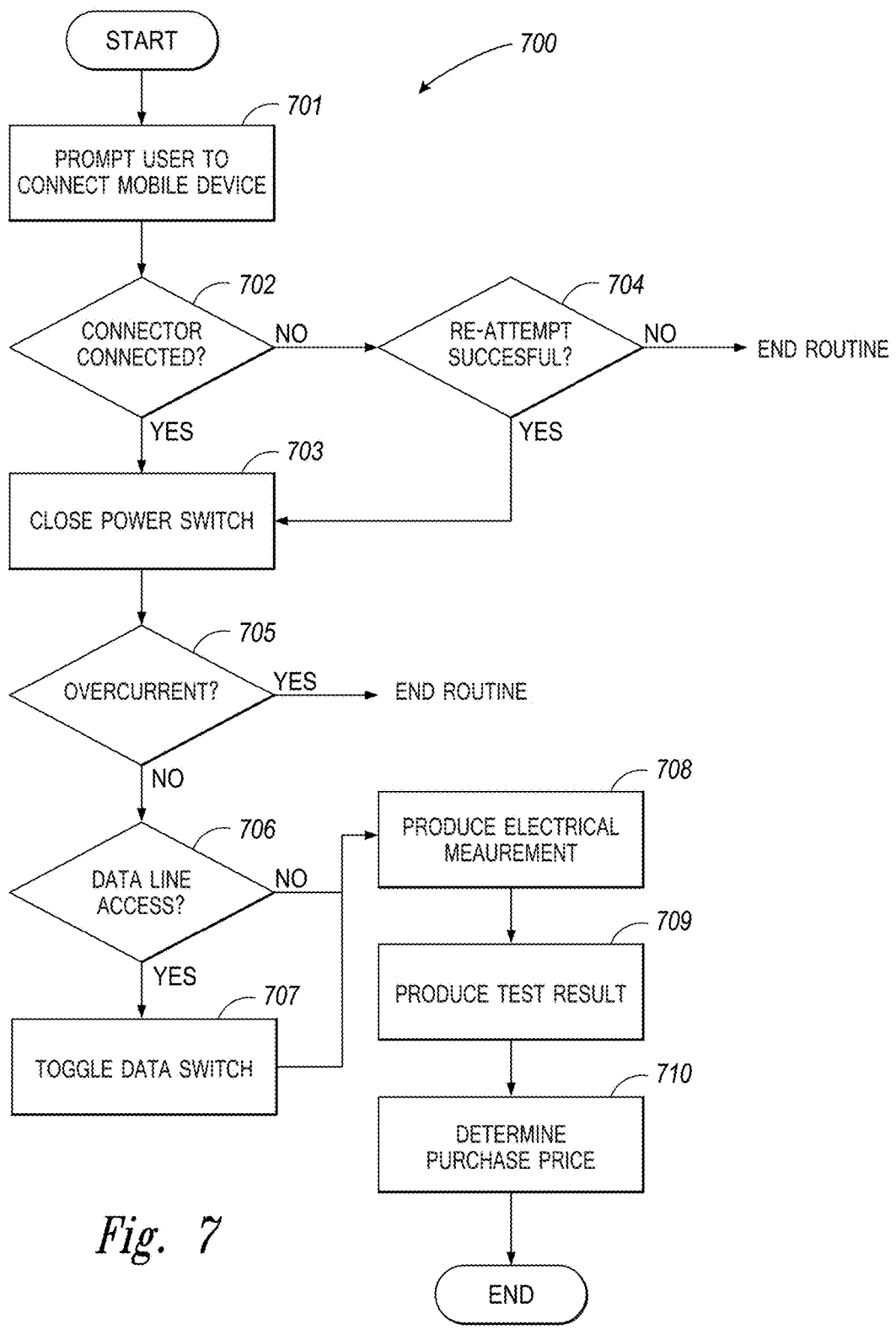
FIG. 7 is a representative flow diagram that depicts processes for electrically testing and recycling mobile devices or other consumer electronic devices in accordance with an embodiment of the present technology.

FIG. 7 is a flow routine 700 for electrically testing and recycling a mobile device or other consumer electronic device in accordance with an embodiment of the present technology. In various embodiments, the routine 700 can be executed at a kiosk, such as the kiosk 100 (FIG. 1). For example, the routine 700 can be carried out by the controller 422 (FIG. 4A), the CPU 300 (FIG. 3), or in part by the CPU 300 and in part by the controller 422. In some embodiments, the routine 700 can begin after the visual inspection stage at the kiosk 100 has concluded, although in other embodiments the routine 700 can begin before the visual inspection stage or the routine 700 can be carried concurrently with the visual inspection.

In block 701, the routine 700 begins by prompting a user to connect a mobile device to one of the electrical connectors 242 (FIG. 2C). As noted above, the connector carrier 240 (FIG. 2C) can supply a user with an appropriate connector that corresponds to the connector port (e.g., a micro-USB port) of the mobile device. In block 702, the routine verifies whether the electrical connector has been connected. In one embodiment, the user can confirm that a connector has been connected by pressing a soft button on the kiosk's touchscreen 308 (FIG. 3) or by operating another input device (e.g., a keypad). Alternately, the routine 700 can automatically detect whether the connector has been connected, such as by sending a test voltage or test signal to the mobile device 480 (FIG. 4A) over the first power line 446*a* and/or the data lines 445*a-b*. In either case, when the routine 700 verifies the connection, the routine 700 proceeds to block 703 to begin an electrical measurement. Otherwise, the routine 700 proceeds to decision block 704 to re-attempt the electrical connection.

In block 704, if the routine 700 cannot verify the electrical connection, the routine 700 prompts the user (e.g., via the touchscreen 308) to check that the electrical connector has been properly connected to the mobile device. Once the user confirms the connection, the routine 700 can then re-attempt verification. If subsequent attempts to connect the mobile device fail, the routine 700 can terminate the electrical test, which can include notifying the user that the test has failed and returning the mobile device. If the re-attempt is successful, however, the routine 700 can proceed to block 703. In some embodiments, the routine 700 can also prompt the user to connect a different one of the electrical connectors 242 to his or her mobile device. If the connection is successful with the new connector, the routine 700 can flag the former connector as having a potential issue, and the kiosk 100 will not allow users to use this connector until it can be inspected by a maintenance technician or other service personnel.

In block 703, the routine 700 closes the power switch 455 (FIG. 4B) to begin the electrical measurement. In decision block 705, the routine 700 determines whether there is an overcurrent. If the routine 700 does not detect an overcurrent, the routine proceeds to block 706; otherwise, the routine 700 opens the power switch 455 and terminates the electrical test. As noted above, the power switch 455 can trip to prevent electrical damage to the testing electronics and other electronics of the kiosk 100.

In block 706, the routine 700 determines whether the controller 422 (FIG. 6) requires data line access. For example, the controller 422 can access the data lines to operate device hardware components, as discussed above. If the controller 422 needs data line access, the routine proceeds to block 707 to toggle the data switch 630 (FIG. 6) to the second switch state, and the routine 700 proceeds to block 708.

In block 708, the routine 700 measures electrical quantities, such as the device current (e.g., the charge current), resistance, capacitance, inductance, or other quantities, associated with device hardware components, including, e.g., the charging circuit 483 (FIG. 4A), the memory, the camera, the display, and/or the vibrator motors. In one embodiment, the routine 700 can activate (e.g., power on or wake up) a hardware component by sending a signal over the mobile device's data lines 495*a-b* (FIG. 4A) and then measure any changes in the device current $I_d$ on the power line 496 (FIG. 4A) produced in response to activating the hardware component.

The routine 700 can also send test packets to the mobile device over the data lines 495*a-b*. In one embodiment, the routine 700 can use the test packets to determine if the mobile device has been powered on. For example, even when the device is powered off, the mobile device may still draw a charge current. If the routine 700 does not receive return packets in response to the test packets, the routine 700 can return the mobile device to the user and display a prompt to power on the mobile device.

In one embodiment, the routine 700 can measure the amount of time it takes to receive return packets from the mobile device to determine a time of flight. If the time of flight is relatively long, this may indicate that the operating system has too many background resources (e.g., applications) running at the same time and that the mobile processor 384 (FIG. 3) may be over-tasked. An over-tasked processor may draw a significant amount of current from the mobile device's power line, which may make it difficult to accurately determine the amount of electrical current being draw by, e.g., the charging circuit. A large signal latency can also indicate that the mobile processor may be underperforming.

In another embodiment, the routine 700 can use test packets to detect for a dummy device. For example, the routine 700 can send a stream of random and unpredictable requests to the mobile device. When the routine 700 receives responses to the requests it can determine if the mobile device is a genuine device based on whether the responses accord with the requests. In one embodiment, the routine 700 can send a stream of randomly generated USB device requests, such as an arbitrary order of "Get status," "Set Feature," "Set address," and "Get descriptor" requests.

In block 709, the routine 700 produces a test result based on the electrical measurement at block 708. As discussed above, the test result can include, for example, a pass/fail indication or a score that is based on a comparison of the electrical measurement to a threshold (e.g., $I_{max}$), a range of acceptable electrical quantities (e.g., a range falling between $I_{min}$ and $I_{max}$), and/or a device signature. In one embodiment, the routine 700 can look-up device signatures in a look-up table based on the mobile device's VID/PID.

In block 710, the routine 700 determines a purchase price of the mobile device based on the test result. The purchase price can also be based on other factors, including the age, model type, and/or the physical condition of the device, as noted above. For example, the purchase price can be based on a weighted average of scores corresponding to the mobile device's electrical performance and the device's visual appearance. As discussed above, the user can either accept the purchase price to complete the sale, or the user can reject the purchase price, and the kiosk 100 will return the device. In some instances, the routine 700 may not determine a purchase price all, such as if the device is determined to be a fake or is too badly damaged. Even if the mobile device fails the electrical test, or if the routine 700 determines that some of the hardware components are malfunctioning, a purchase price may still be offered to a user. For example, some of the functioning hardware parts (e.g., the memory, the display, the battery, etc.) may still have resale value and may be recoverable from the device. Alternately, a nominal price (e.g., $1.00) may be offered to a user to incentivize the user to recycle the mobile device rather than dispose the device to a landfill.

Although not required, aspects of the invention are described in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A kiosk for processing mobile devices, the kiosk comprising:
    a processor;
    a controller downstream from the processor;
    a switch operably coupled to the processor and the controller, wherein the switch has a first switch state and a second switch state;
    an electrical connector downstream from the controller, wherein the electrical connector is configured to be electrically connected to a mobile device;
    a memory; and
    a non-transitory computer readable medium having instructions stored therein that are executable by the controller to—
        toggle the switch between the first switch state and the second switch state, wherein, in the first switch state, the processor is coupled to the electrical connector and the controller is disconnected from the electrical connector, and wherein in the second switch state, the controller is coupled to the electrical connector and the processor is disconnected from the electrical connector,
        produce a test result by performing an electrical test over the electrical connector when the switch is in the first switch state, and
        forward the test result to the processor when the switch is in the second switch state.

2. The kiosk of claim 1 wherein the mobile device has an electrical hardware component, and wherein the instructions are executable by the controller to carry out an electrical test of the hardware component while the switch is in the second switch state.

3. The kiosk of claim 2, further comprising a non-transitory computer readable media having instructions stored therein that are executable by the processer to valuate, identify, and/or authenticate the mobile device based at least in part on the electrical test.

4. The kiosk of claim 3, wherein the instructions are executable by the processor to:
    look up at least one reference quantity in a database associated with a make and/or model of the mobile device;
    compare the electrical measurement to the at least one reference quantity;
    produce a test result based on the comparison; and
    determine an appropriate purchase price of the mobile device based at least in part on the test result.

5. The kiosk of claim 4, wherein the at least one reference quantity includes:
    a quantity corresponding to a maximum allowable electrical current; and
    a quantify corresponding to a minimum allowable electrical current.

6. The kiosk of claim 2, further comprising:
    a display; and
    a non-transitory computer readable media having instructions stored therein that are executable by the processer to—
        determine an appropriate purchase price of the mobile device based at least in part on the electrical test, and
        display the purchase price to a user on the display.

7. The kiosk of claim 2 wherein the mobile device has a device bus having data lines, and wherein the instructions are executable by the controller to send test signals to the hardware component over the data lines while the switch is in the second switch state.

8. The kiosk of claim 7 wherein the test signals include test packets.

9. The kiosk of claim 2, wherein the hardware component is a charging circuit.

10. The kiosk of claim 1, wherein the switch further comprises a first switch port, a second switch port, and a third switch port, wherein:
- in the first switch state, the first switch port is connected to the third switch port and the second switch port is disconnected from the third switch port; and
- in the second switch state, the second switch port is connected to the third switch port and the first switch port is disconnected from the third switch port.

11. A kiosk for resale and recycling of mobile devices, comprising
- means for electrically connecting to a mobile device;
- means for producing an electrical measurement by measuring an electrical attribute associated with a mobile device connected to the means for electrically connecting to the mobile device, the means for producing an electrical measurement comprising:
  - a processor;
  - a controller; and
  - a switch operably coupled to the processor and the controller, wherein the switch is configured to toggle between a first switch state and a second switch state, wherein, in the first switch state the processor is coupled to the means for electrically connecting to the mobile device and the controller is disconnected from the means for electrically connecting to the mobile device, and wherein in the second switch state the controller is coupled to the means for electrically connecting to the mobile device and the processor is disconnected from the means for electrically connecting to the mobile device; and
- means for determining a purchase price of the mobile device based on the electrical measurement.

12. The kiosk of claim 11, wherein the electrical attribute is a charge current drawn by the mobile device to charge a battery.

13. The kiosk of claim 11, wherein the electrical attribute is an electric current drawn from a hardware component of the mobile device.

* * * * *